(12) United States Patent  
Kataoka et al.

(10) Patent No.: US 9,106,328 B2  
(45) Date of Patent: Aug. 11, 2015

(54) LIVING BODY COMMUNICATION APPARATUS

(71) Applicant: Kabushiki Kaisha Toshiba, Minato-ku, Tokyo (JP)

(72) Inventors: Kazuki Kataoka, Kanagawa-ken (JP); Kazuhiro Inoue, Tokyo (JP); Takafumi Ohishi, Kanagawa-ken (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 17 days.

(21) Appl. No.: 14/163,870

(22) Filed: Jan. 24, 2014

(65) Prior Publication Data

US 2015/0038075 A1    Feb. 5, 2015

(30) Foreign Application Priority Data

Aug. 1, 2013 (JP) .................................. 2013-160022

(51) Int. Cl.
*H04B 5/00* (2006.01)
*H04B 13/00* (2006.01)

(52) U.S. Cl.
CPC .................................. *H04B 13/005* (2013.01)

(58) Field of Classification Search
USPC ....................................................... 455/41.1
See application file for complete search history.

(56) References Cited

U.S. PATENT DOCUMENTS

| 6,223,018 | B1 | 4/2001 | Fukumoto et al. | |
|---|---|---|---|---|
| 2003/0088302 | A1* | 5/2003 | Shirakawa et al. | 607/122 |
| 2012/0041292 | A1* | 2/2012 | Ko et al. | 600/372 |

FOREIGN PATENT DOCUMENTS

| JP | 10-229357 A | 8/1998 |
|---|---|---|
| JP | 2000224083 A | 8/2000 |
| JP | 2001007735 A | 1/2001 |
| JP | 2003037566 A | 2/2003 |
| JP | 2007176323 A | 7/2007 |
| JP | 2009239717 A | 10/2009 |

* cited by examiner

*Primary Examiner* — Ajibola Akinyemi
(74) *Attorney, Agent, or Firm* — White & Case LLP

(57) ABSTRACT

According to an embodiment, a first communication equipment includes a first communication unit configured to transmit and receive a signal, and a first conductor electrically connected to the first communication unit. A second communication equipment includes a second conductor, a third conductor located in parallel with the second conductor and set to first reference potential, a fourth conductor separated from the second conductor and located substantially orthogonal to the second conductor, a fifth conductor located in parallel with the fourth conductor and set to the first reference potential, a first detection unit configured to detect a first differential output between signal outputs respectively observed by the second conductor and the fourth conductor, and a second communication unit configured to receive the first differential output and transmit and receives a signal.

20 Claims, 22 Drawing Sheets

| SIGNAL LEVEL (dB) | WITH HUMAN BODY 3 (dB) | WITHOUT HUMAN BODY 3 (dB) |
|---|---|---|
| Sout1 | −70 | −79 |
| Sout2 | −68 | −60 |
| Sdt1 | −2 | −19 |

FIG. 4(A)

| SIGNAL LEVEL (dB) | WITH HUMAN BODY 3 (dB) | WITHOUT HUMAN BODY 3 (dB) |
|---|---|---|
| Sout2 | −68 | −60 |

FIG. 4(B)

|  |  | SIGNAL LEVEL AT THE TIME OF TRANSMISSION OF COMMUNICATION EQUIPMENT 1 (dB) |
|---|---|---|
| WITH HUMAN BODY 3 (COMMUNICATION EQUIPMENT 2) | Sout1 | −77.72 |
|  | Sout2 | −76.50 |
|  | Sdt1 | −1.22 |
| WITHOUT HUMAN BODY 6 (COMMUNICATION EQUIPMENT 5) | Sout21 | −107.53 |
|  | Sout22 | −89.95 |
|  | Sdt2 | −17.58 |

| Sout1−Sout21 | +29.81 |
|---|---|
| Sout2−Sout22 | +13.45 |
| (Sout1−Sout21)−(Sout2−Sout22) | +16.36 |

FIG. 10

|  |  | SIGNAL LEVEL AT THE TIME OF TRANSMISSION OF COMMUNICATION EQUIPMENT 1 (dB) | SIGNAL LEVEL AT THE TIME OF TRANSMISSION OF COMMUNICATION EQUIPMENT 4 (dB) |
|---|---|---|---|
| WITH HUMAN BODY 3 (COMMUNICATION EQUIPMENT 2) | Sout1 | −77.54 | −91.51 |
|  | Sout2 | −76.46 | −89.15 |
|  | Sdt1 | −1.08 | −2.36 |
| WITH HUMAN BODY 6 (COMMUNICATION EQUIPMENT 5) | Sout21 | −93.14 | −77.49 |
|  | Sout22 | −90.58 | −76.46 |
|  | Sdt2 | −2.56 | −1.03 |

| | | |
|---|---|---|
| Sout1−Sout21 | +15.60 | −14.02 |
| Sout2−Sout22 | +14.12 | −12.69 |
| (Sout1−Sout21)−(Sout2−Sout22) | +1.48 | −1.33 |

FIG. 12

|  |  | SIGNAL LEVEL AT THE TIME OF TRANSMISSION OF COMMUNICATION EQUIPMENT 1 (dB) | SIGNAL LEVEL AT THE TIME OF TRANSMISSION OF COMMUNICATION EQUIPMENT 4 (dB) |
|---|---|---|---|
| WITH HUMAN BODY 3 (COMMUNICATION EQUIPMENT 2) | Sout1 | −78.20 | −90.26 |
|  | Sout2 | −76.17 | −92.75 |
|  | Sdt1 | −2.03 | +2.49 |
| WITH HUMAN BODY 6 (COMMUNICATION EQUIPMENT 5) | Sout21 | −90.97 | −77.87 |
|  | Sout22 | −93.11 | −75.84 |
|  | Sdt2 | +2.14 | −2.03 |

| | | |
|---|---|---|
| Sout1−Sout21 | +12.77 | −12.39 |
| Sout2−Sout22 | +16.94 | −16.91 |
| (Sout1−Sout21)−(Sout2−Sout22) | −4.17 | +4.52 |

FIG. 14

| CONTACT LEFT HAND OF HUMAN BODY 3 TO REFERENCE CONDUCTOR 73 | | SIGNAL LEVEL AT THE TIME OF TRANSMISSION OF COMMUNICATION EQUIPMENT 1 (dB) | SIGNAL LEVEL AT THE TIME OF TRANSMISSION OF COMMUNICATION EQUIPMENT 4 (dB) |
|---|---|---|---|
| WITH HUMAN BODY 3 (COMMUNICATION EQUIPMENT 2) | Sout1 | −79.17 | −93.14 |
| | Sout2 | −76.97 | −97.48 |
| | Sdt1 | −2.20 | +4.34 |
| WITH HUMAN BODY 6 (COMMUNICATION EQUIPMENT 5) | Sout21 | −91.08 | −77.89 |
| | Sout22 | −93.26 | −75.80 |
| | Sdt2 | +2.18 | −2.09 |

| | | |
|---|---|---|
| Sout1−Sout21 | +11.91 | −15.25 |
| Sout2−Sout22 | +16.29 | −21.68 |
| (Sout1−Sout21)−(Sout2−Sout22) | −4.38 | +6.43 |

FIG. 15

LIVING BODY COMMUNICATION APPARATUS

CROSS REFERENCE TO RELATED APPLICATION

This application is based upon and claims the benefit of priority from the prior Japanese Patent Application No. 2013-160022, filed on Aug. 1, 2013, the entire contents of which are incorporated herein by reference.

FIELD

Embodiments described herein relate to a living body communication apparatus.

BACKGROUND

Living body communication in which communication data are transmitted and received through living bodies such as human bodies has been drawing attention. The living body communication is expected an application for medical and health care services, short-range wireless communication practices, in-vehicle wireless communication operations, amusement activities, and the like. The living body communication can significantly reduce power consumption as compared to some conventional wireless communication techniques.

In the living body communication, each communication apparatus configured to use a living body as part of a transmission path is provided with two electrodes. One is a signal electrode connected to a signal line, and the other is a reference potential electrode connected to ground potential of the communication apparatus having reference potential. The signal electrodes of the respective communication apparatuses are electrically connected together mainly through the living body, while the reference potential electrodes of the respective communication apparatuses are electrically connected together mainly through the space or the earth. Thereby, each communication apparatus transmits the potential difference between the signal electrode and the reference potential electrode to the counterpart communication apparatus.

In the case where a living body communication apparatus that uses electric fields on surfaces of living bodies is applied to a system to perform ID authentication of individuals, living bodies cause capacitance coupling when the living bodies come close to each other. Accordingly, there is a problem of difficulty in associating an ID of each individual with the living body communication apparatus due to an increase in crosstalk, which is inherent in the living body communication that uses the living body as a transmission path.

BRIEF DESCRIPTION OF THE DRAWINGS

FIG. 4(A) and FIG. 4(B) are tables showing characteristics of the living body communication apparatus according to the first embodiment;

FIG. 10 is a table showing characteristics of the living body communication apparatus according to the second embodiment;

FIG. 12 is a table showing characteristics of the living body communication apparatus according to the second embodiment;

FIG. 14 is a table showing characteristics of the living body communication apparatus according to the third embodiment;

FIG. 15 is a table showing characteristics of the living body communication apparatus according to the third embodiment;

DETAILED DESCRIPTION

Figure 1:
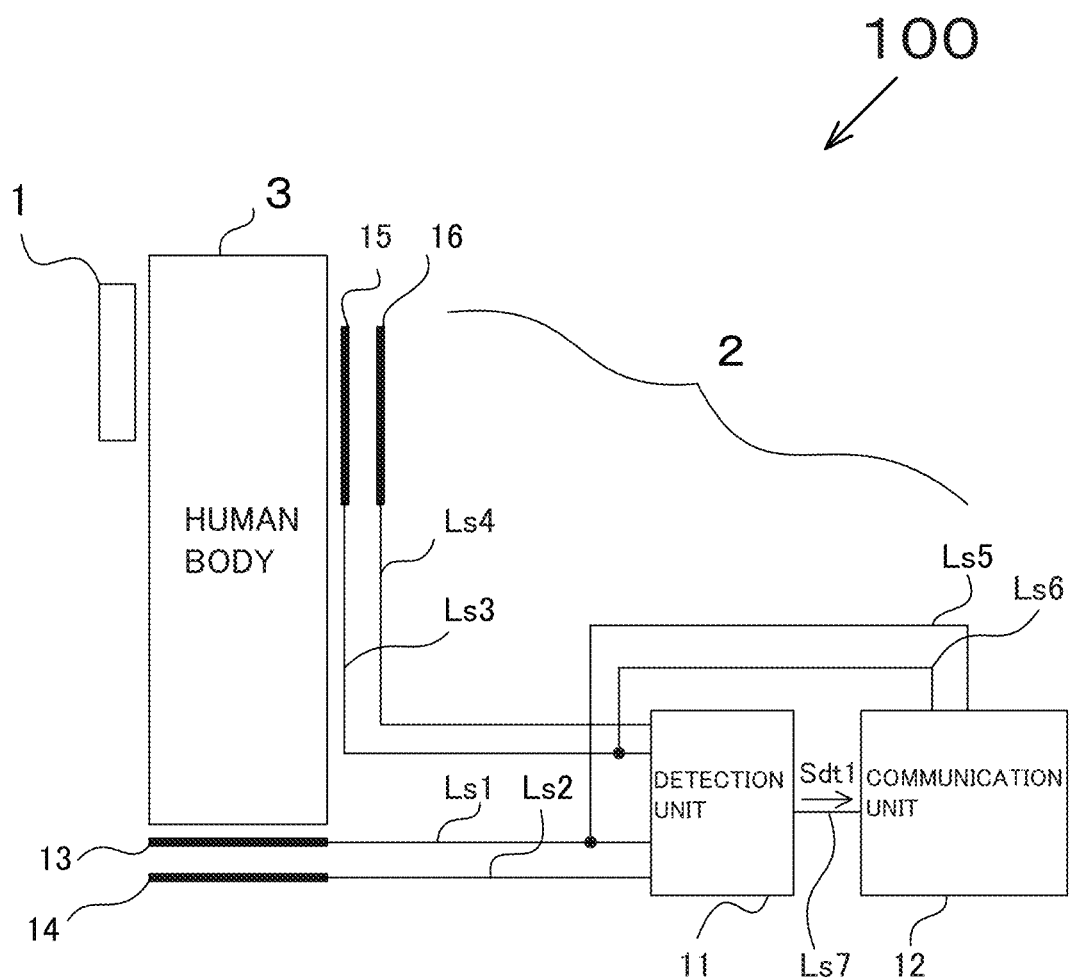
FIG. 1 is a diagram showing a schematic configuration of a living body communication apparatus according to a first embodiment.

According to an embodiment, a living body communication apparatus includes first communication equipment and second communication equipment. The first communication equipment includes a first communication unit configured to transmit and receive a signal, and a first conductor electrically connected to the first communication unit. The second communication equipment includes a second conductor, a third conductor located in parallel with the second conductor and set to first reference potential, a fourth conductor separated from the second conductor and located substantially orthogonal to the second conductor, a fifth conductor located in parallel with the fourth conductor and set to the first reference potential, a first detection unit configured to detect a first differential output between signal outputs respectively observed by the second conductor and the fourth conductor, and a second communication unit configured to receive the first differential output and transmit and receives a signal. Communication is executed between the first communication equipment and the second communication equipment when a surface of a first living body comes into contact with or close to the first conductor, the second conductor, and the fourth conductor.

According to another embodiment, a living body communication apparatus includes first communication equipment and second communication equipment. The first communication equipment includes a first communication unit configured to transmit and receive a signal, and a first conductor electrically connected to the first communication unit. The second communication equipment includes a second conductor, a third conductor located in parallel with the second conductor and set to first reference potential, a fourth conductor separated from the second conductor and located substantially orthogonal to the second conductor, a fifth conductor located in parallel with the fourth conductor and set to the first reference potential, and an authentication unit configured to receive a first signal output observed by the second conductor, a second signal output observed by the fourth conductor, and a first differential output between the first signal output and the second signal output, and to perform authentication of a first human body with the attached first communication equipment when the first human body comes into contact with or close to the second conductor and the fourth conductor.

Embodiments will further be described below with reference to the drawings. In the drawings, the same reference numerals represent the same or similar portions.

Figure 2:
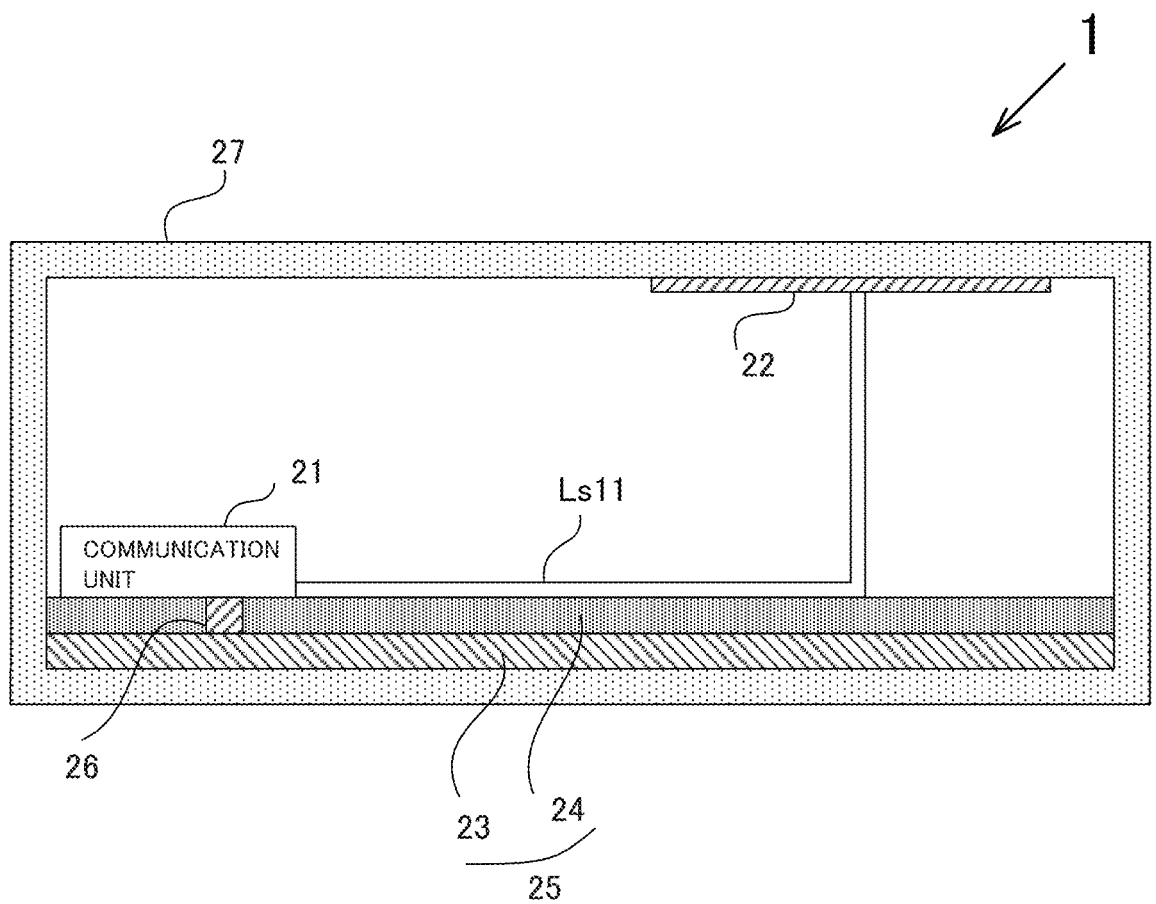
FIG. 2 is a cross-sectional view showing a configuration of first communication equipment according to the first embodiment.
Figure 3:
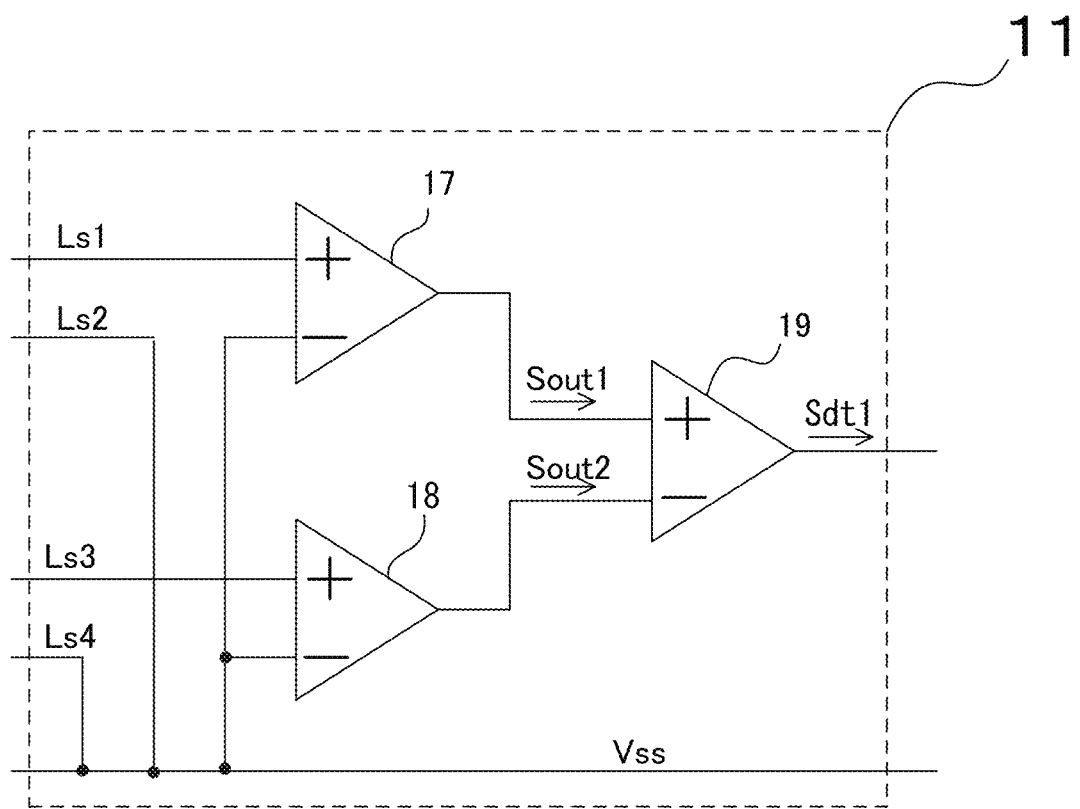
FIG. 3 is a block diagram showing a configuration of a first detection unit according to the first embodiment.

A living body communication apparatus according to a first embodiment will be described with reference to FIGS. 1, 2 and 3. FIG. 1 is a diagram showing a schematic configuration of the living body communication apparatus. FIG. 2 is a cross-sectional view showing a configuration of first communication equipment. FIG. 3 is a block diagram showing a configuration of a first detection unit. In the embodiment, living body communication is performed between the first communication equipment and second communication equipment through the human body. Here, signal electrodes and reference potential electrodes of the second communication equipment are paired respectively. One pair of the signal electrode and the reference potential electrode located close to the first communication equipment and the other pair of the signal electrode and the reference potential electrode located far from the first communication equipment are located substantially orthogonal to each other.

As shown in FIG. 1, a living body communication apparatus 100 is provided with communication equipment 1 (the first communication equipment) and communication equipment 2 (the second communication equipment). The living body communication apparatus 100 is a living body communication apparatus which uses an electric field on a surface of a human body 3. The living body communication apparatus 100 executes transmission and reception between the communication equipment 1 and the communication equipment 2 through the human body 3.

The communication equipment 1 is attached to the chest of the human body 3, for example. As shown in FIG. 2, the communication equipment 1 is provided with a communication unit 21 (a first communication unit), a conductor 22 (a first conductor), a substrate 25 (a first substrate), a via-hole 26, a signal line Ls11 (a first signal line), and a housing 27.

The housing 27 has a box shape which is greater in a horizontal direction than in a height direction. The communication unit 21, the conductor 22, the substrate 25, the signal line Ls11, and the via-hole 26 are covered with and housed in the housing 27.

Although the housing 27 is formed in the box shape, the housing 27 may be formed in a box shape with rounded corners, an oval sphere shape, or the like instead.

The substrate 25 includes a dielectric material 24 and a reference potential electrode 23. The reference potential electrode 23 is also referred to as a ground electrode. The dielectric material 24 is provided on a first principal surface (a top face) of the reference potential electrode 23. The dielectric material 24 is formed from an insulative ceramic or an insulative organic material, for example. The reference potential electrode 23 is formed from a metal layer of copper (Cu) or gold (Au), for example.

The communication unit 21 is provided on a first principal surface (a top face) of the dielectric material 24 and configured to transmit and receive a signal. A not-illustrated ground electrode of the communication unit 21 is connected to the reference potential electrode 23 through the via-hole 26. The conductor 22 functions as a signal electrode. The conductor 22 is provided on the first principal surface side of the dielectric material 24 and is provided on an upper inner wall of the housing 27. The conductor 22 is connected to the communication unit 21 through the signal line Ls11. The signal line Ls11 has an L-shaped structure, and a portion of the signal line Ls11 on the communication unit 21 side is provided on the principal surface (the top face) of the dielectric material 24.

The communication equipment 2 is provided with a detection unit 11, a communication unit 12 (a second communication unit), conductors 13 to 16, a signal line Ls1, a signal line Ls3, signal lines Ls5 to Ls7, a reference potential line Ls2, and a reference potential line Ls4.

The conductor 13 (a second conductor) functions as a signal electrode. The conductor 13 is located in contact with or close to the human body 3. The conductor 14 (a third conductor) is located in parallel with the conductor 13 and is located away from the human body 3.

The conductor 15 (a fourth conductor) functions as a signal electrode. The conductor 15 is located substantially orthogonal to the conductor 13 and is located in contact with or close to the human body 3. The conductor 16 (a fifth conductor) is located in parallel with the conductor 15 and is located away from the human body 3.

Here, the conductor 15 and the conductor 16 are located closer to the communication equipment 1 than the conductor 13 and the conductor 14 are with the human body 3 interposed in between.

Of the signal line Ls1 (a second signal line), one end is connected to the conductor 13 and the other end is connected to the detection unit 11. The reference potential line Ls2 (a first reference potential line) is set to ground potential, for example. Of the reference potential line Ls2, one end is connected to the conductor 14 and the other end is connected to the detection unit 11.

Of the signal line Ls3 (a third signal line), one end is connected to the conductor 15 and the other end is connected to the detection unit 11. The reference potential line Ls4 (a second reference potential line) is set to ground potential, for example. Of the reference potential line Ls4, one end is connected to the conductor 16 and the other end is connected to the detection unit 11.

Each of the conductors 13 to 16 and the conductor 22 has a plate-like shape, for example, and employs a conductive sheet such as a copper foil, a conductive ink that is formed into a thin film by coating or using an inkjet method and is then sintered, a transparent conductor such as ITO (indium tin oxide), or the like.

As shown in FIG. 3, the detection unit 11 is provided with a comparator 17, a comparator 18, and a comparator 19.

Of the comparator 17, a positive (+) port on an input side is connected to the signal line Ls1 and a negative (−) port on the input side is set to reference potential Vss (connected to the reference potential line Ls2). The comparator 17 outputs a compared and amplified signal Sout1 (a first signal output). Of the comparator 18, a positive (+) port on an input side is connected to the signal line Ls3 and a negative (−) port on the input side is set to the reference potential Vss (connected to the reference potential line Ls4). The comparator 18 outputs a compared and amplified signal Sout2 (a second signal output).

Of the comparator 19, the signal Sout1 is inputted to a positive (+) port on an input side and the signal Sout2 is inputted to a negative (−) port on the input side. The comparator 19 outputs a compared and amplified detection signal Sdt1 (a first differential output).

The detection signal Sdt1 outputted from the detection unit 11 is inputted to the communication unit 12. The communication unit 12 is connected to the signal line Ls1 through the signal line Ls5, and is connected to the signal line Ls3 through the signal line Ls6. The communication unit 12 transmits and receives a signal to and from the communication unit 21 of the communication equipment 1.

Here, the conductor 15 and the conductor 16 are located substantially parallel to the communication equipment 1 with the human body 3 interposed in between. The conductor 13 and the conductor 14 are located substantially perpendicular to the communication equipment 1 while interposing the human body 3 in between. In addition, the conductor 15 and the conductor 16 are located closer to the communication equipment 1 than the conductor 13 and the conductor 14 are.

Next, characteristics of the living body communication apparatus will be described with reference to FIG. 4(A) and FIG. 4(B). FIG. 4(A) is a table showing characteristics of the living body communication apparatus 100 of the embodiment and FIG. 4(B) is a table showing characteristics of a living body communication apparatus of a comparative example. The living body communication apparatus of the comparative example is not provided with the conductor 13 or the conductor 14. Values shown in FIG. 4(A) and FIG. 4(B) are calculated by electromagnetic field simulation and are normalized with a transmission level of the communication equipment 1.

As shown in FIG. 4(A), in the living body communication apparatus 100 of the embodiment, a signal level of the detection signal Sdt1 is relatively small (−19 dB) when the human body 3 is not present. On the other hand, the signal level of the detection signal Sdt1 is relatively large (−2 dB) when the human body 3 is present. For this reason, the living body communication apparatus 100 can determine the presence of the human body 3. When information on an ID of an individual is transmitted from the communication unit 21 of the communication equipment 1, it is possible to associate authentication of the ID of the individual with a nearby communication apparatus, which is not illustrated.

As shown in FIG. 4(B), in the living body communication apparatus of the comparative example, a detection level is higher when the human body 3 is not present (−60 dB) than when the human body 3 is present (−68 dB). Accordingly, the living body communication apparatus cannot simply determine that the human body 3 is present in the case where the detection level exceeds a given threshold. As a consequence, it is difficult for the living body communication apparatus of the comparative example to determine the presence of the human body 3.

As described above, in the living body communication apparatus of the embodiment, transmission and reception is executed between the communication equipment 1 and the communication equipment 2 through the human body 3. The communication equipment 1 is provided with the communication unit 21, the conductor 22, the substrate 25, the via-hole 26, the signal line Ls11, and the housing 27. The communication equipment 2 is provided with the detection unit 11, the communication unit 12, the conductors 13 to 16, the signal line Ls1, the signal line Ls3, the signal lines Ls5 to Ls7, the reference potential line Ls2, and the reference potential line Ls4. The conductor 15 and the conductor 16 are located substantially parallel to the communication equipment 1 with the human body 3 interposed in between. The conductor 13 and the conductor 14 are located substantially perpendicular to the communication equipment 1 with the human body 3 interposed in between. In addition, the conductor 15 and the conductor 16 are located closer to the communication equipment 1 than the conductor 13 and the conductor 14 are.

Accordingly, the living body communication apparatus 100 of the embodiment can determine the presence of the human body 3. When the information on the ID of the individual is transmitted from the communication equipment 1, it is possible to associate the authentication of the ID of the individual with the nearby communication apparatus.

Figure 5:
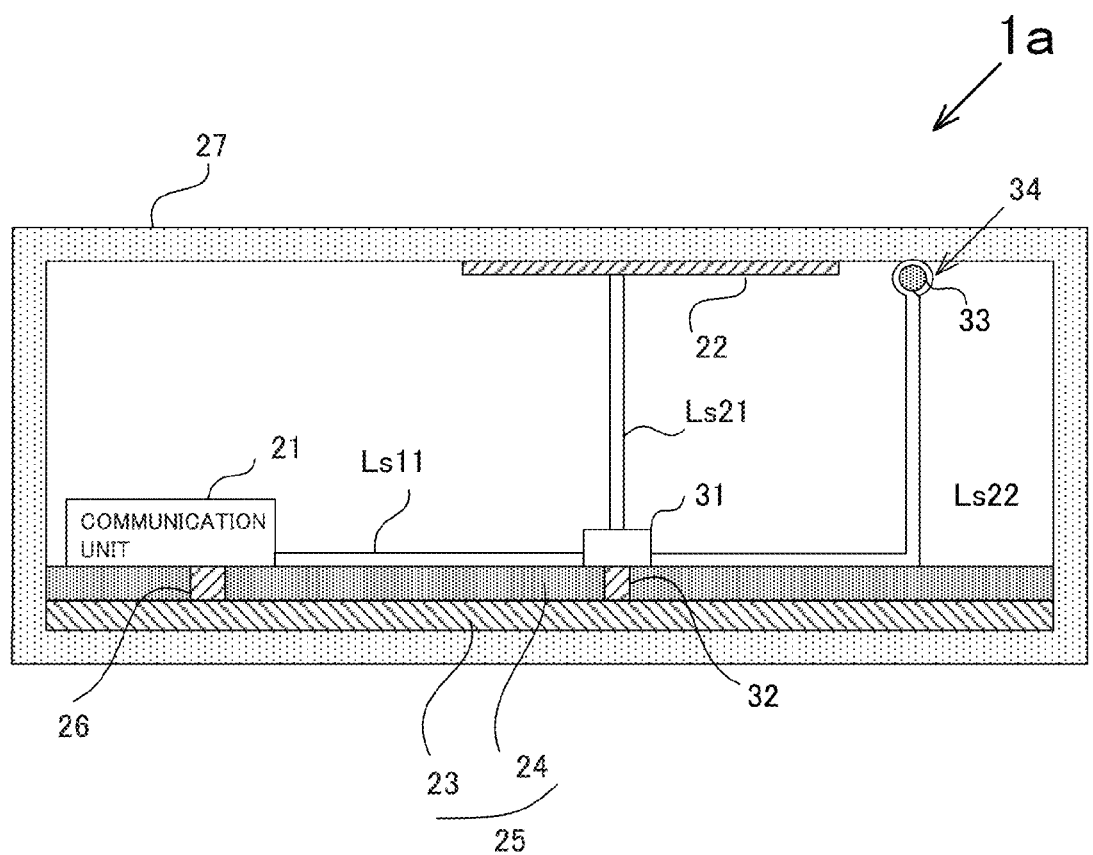
FIG. 5 is a cross-sectional view showing a configuration of first communication equipment according to a first modification.

In the embodiment, the communication equipment 1 is provided with the conductor 22. However, the invention is not limited only to the above-described configuration. For example, it is possible to provide a magnetic field transmission reception unit 34 like in communication equipment 1a of a first modification shown in FIG. 5. Specifically, a terminal 31 is provided on the first principal surface (the top face) of the dielectric material 24. The terminal 31 is connected to the communication unit 21 through the signal line Ls11. A not-illustrated ground electrode of the terminal 31 is connected to the reference potential electrode 23 through a via-hole 32. The terminal 31 is connected to the conductor 22 through a signal line Ls21. The magnetic field transmission reception unit 34 is provided on the upper inner wall of the housing 27, and in parallel with the conductor 22. The magnetic field transmission reception unit 34 has a structure in which a signal line is wound around a ferrite bar 33. The magnetic field transmission reception unit 34 is connected to the terminal 31 through a signal line Ls22. The signal line Ls22 has an L-shaped structure, and a portion of the signal line Ls22 on the terminal 31 side is provided on the principal surface (the top face) of the dielectric material 24.

Meanwhile, in the embodiment, the conductor 22 is provided on the upper inner wall of the housing 27. However, the invention is not limited only to the above-described configuration. For example, the conductor 22 may be provided on an upper outer wall of the housing 27. In such a case, the conductor 22 is preferably connected to the signal line Ls21 by way of a through-hole in the housing 27.

Figure 6:
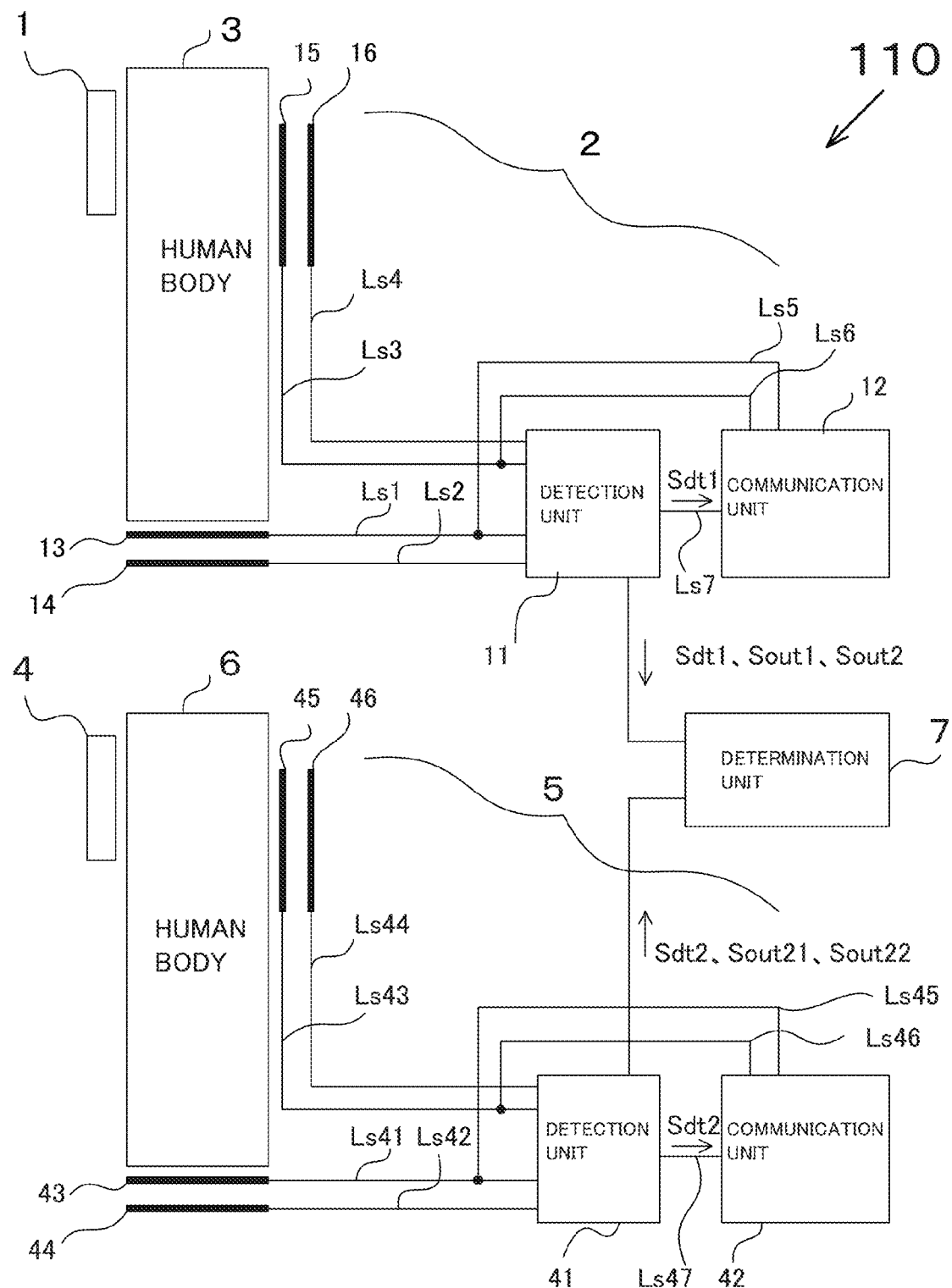
FIG. 6 is a diagram showing a schematic configuration of a living body communication apparatus according to a second embodiment.
Figure 7:
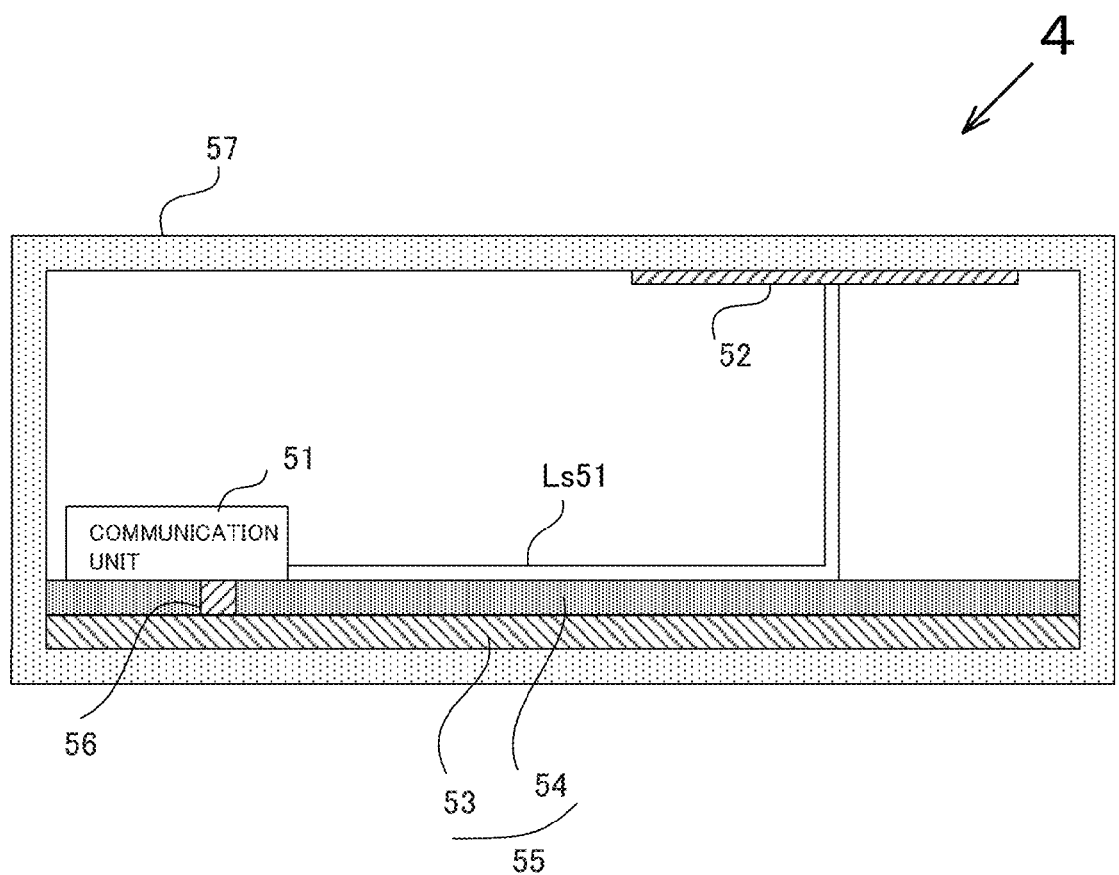
FIG. 7 is a cross-sectional view showing a configuration of third communication equipment according to the second embodiment.
Figure 8:
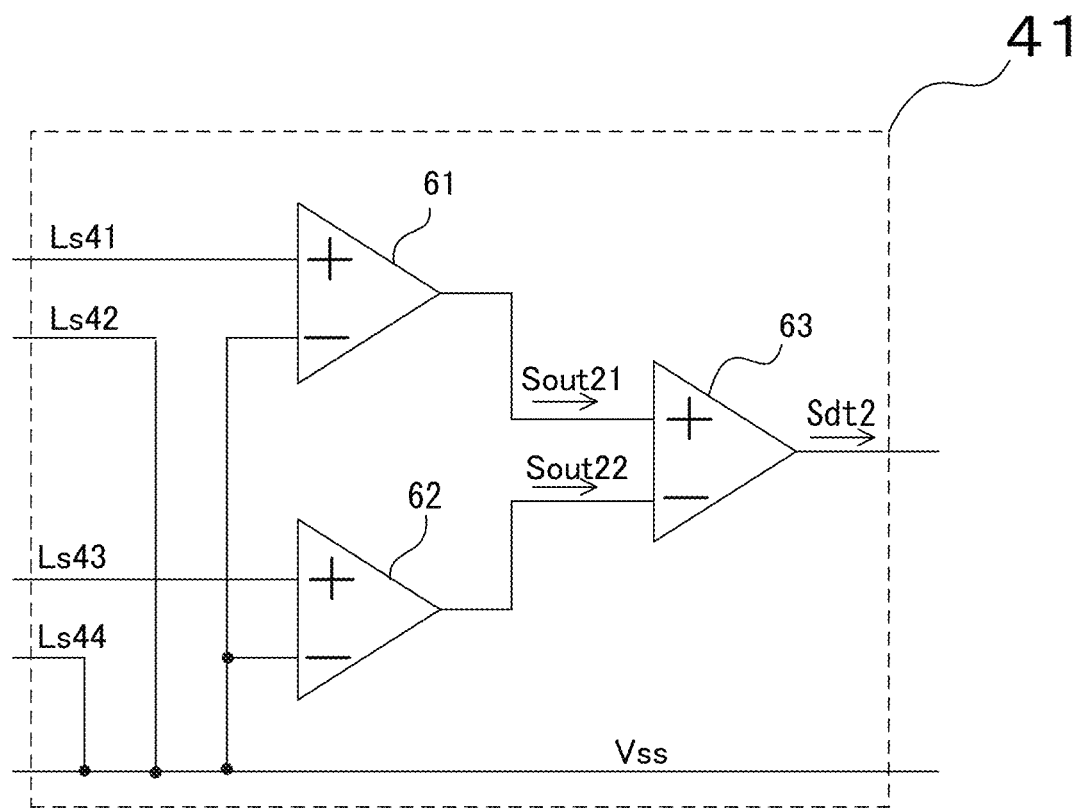
FIG. 8 is a block diagram showing a configuration of a second detection unit according to the second embodiment.

A living body communication apparatus according to a second embodiment will be described with reference to FIGS. 6, 7 and 8. FIG. 6 is a diagram showing a schematic configuration of the living body communication apparatus. FIG. 7 is a cross-sectional view showing a configuration of third communication equipment. FIG. 8 is a block diagram showing a configuration of a second detection unit. In the embodiment, living body communication is performed between the first communication equipment and the second communication equipment through the human body. Here, signal electrodes and reference potential electrodes in pairs are located on the second communication equipment side, respectively, at two positions in a manner that the pairs are substantially orthogonal to each other. Meanwhile, living body communication is performed between the third communication equipment and fourth communication equipment through a human body. Here, signal electrodes and reference potential electrodes in pairs are located on the fourth communication equipment side, respectively, at two positions in a manner that the pairs are substantially orthogonal to each other.

In the following, the same constituent portions as those in the first embodiment will be denoted by the same reference numerals, and descriptions will be given only of different portions while omitting the descriptions of the same constituent portions.

As shown in FIG. 6, a living body communication apparatus 110 is provided with the communication equipment 1, the communication equipment 2, communication equipment 4 (the third communication equipment), communication equipment 5 (the fourth communication equipment), and a determination unit 7. In the living body communication apparatus 110, transmission and reception are executed between the communication equipment 1 and the communication equipment 2 through the human body 3, and transmission and reception are executed between the communication equipment 4 and the communication equipment 5 through a human body 6.

The communication equipment 4 is attached to the chest of the human body 6, for example. As shown in FIG. 7, the communication equipment 4 is provided with a communication unit 51 (a third communication unit), a conductor 52 (a sixth conductor), a substrate 55 (a second substrate), a via-hole 56, a signal line Ls51 (a fourth signal line), and a housing 57.

The housing 57 has a box shape which is greater in a horizontal direction than in a height direction. The communication unit 51, the conductor 52, the substrate 55, the signal line Ls51, and the via-hole 56 are covered with and housed in the housing 57.

Although the housing 57 is formed in the box shape, the housing 57 may be formed in a box shape with rounded corners, an oval sphere shape, or the like instead.

The substrate 55 includes a dielectric material 54 and a reference potential electrode 53. The reference potential electrode 53 is also referred to as a ground electrode. The dielectric material 54 is provided on a first principal surface (a top face) of the reference potential electrode 53. The dielectric material 54 is formed from an insulative ceramic or an insulative organic material, for example. The reference potential electrode 53 is formed from a metal layer of copper (Cu) or gold (Au), for example.

The communication unit 51 is provided on a first principal surface (a top face) of the dielectric material 54 and configured to transmit and receive a signal. In the communication unit 51, a not-illustrated ground electrode is connected to the reference potential electrode 53 through the via-hole 56. The conductor 52 functions as a signal electrode. The conductor 52 is provided on the first principal surface side of the dielectric material 54 and is provided on an upper inner wall of the housing 57. The conductor 52 is connected to the communication unit 51 through the signal line Ls51. The signal line Ls51 has an L-shaped structure, and a portion of the signal line Ls51 on the communication unit 51 side is provided on the principal surface (the top face) of the dielectric material 54.

The communication equipment 5 is provided with a detection unit 41, a communication unit 42 (a fourth communication unit), conductors 43 to 46, a signal line Ls41, a signal line Ls43, signal lines Ls45 to Ls47, a reference potential line Ls42, and a reference potential line Ls44.

The conductor 43 (a seventh conductor) functions as a signal electrode. The conductor 43 is located in contact with or close to the human body 6. The conductor 44 (an eighth conductor) is located in parallel with the conductor 43 and is located away from the human body 6.

The conductor 45 (a ninth conductor) functions as a signal electrode. The conductor 45 is located substantially orthogonal to the conductor 43 and is located in contact with or close to the human body 6. The conductor 46 (a tenth conductor) is located in parallel with the conductor 45 and is located away from the human body 6.

Here, the conductor 45 and the conductor 46 are located closer to the communication equipment 4 than the conductor 43 and the conductor 44 are, with the human body 6 interposed in between.

Of the signal line Ls41 (a fifth signal line), one end is connected to the conductor 43 and the other end is connected to the detection unit 41. The reference potential line Ls42 (a third reference potential line) is set to ground potential, for example. Of the reference potential line Ls42, one end is connected to the conductor 44 and the other end is connected to the detection unit 41.

Of the signal line Ls43 (a sixth signal line), one end is connected to the conductor 45 and the other end is connected to the detection unit 41. The reference potential line Ls44 (a fourth reference potential line) is set to ground potential, for example. Of the reference potential line Ls44, one end is connected to the conductor 46 and the other end is connected to the detection unit 41.

Each of the conductors 43 to 46 and the conductor 52 has a plate-like shape, for example, and employs a conductive sheet such as a copper foil, a conductive ink that is formed into a thin film by coating or using an inkjet method and is then sintered, a transparent conductor such as ITO (indium tin oxide), or the like. The conductor 13, the conductor 15, the conductor 22, the conductor 43, the conductor 45, and the conductor 52 function as signal electrodes, respectively.

As shown in FIG. 8, the detection unit 41 is provided with a comparator 61, a comparator 62, and a comparator 63.

Of the comparator 61, a positive (+) port on an input side is connected to the signal line Ls41 and a negative (−) port on the input side is set to the reference potential Vss (connected to the reference potential line Ls42). The comparator 61 outputs a compared and amplified signal Sout21 (a third signal output). Of the comparator 62, a positive (+) port on an input side is connected to the signal line Ls43 and a negative (−) port on the input side is set to the reference potential Vss (connected to the reference potential line Ls44). The comparator 62 outputs a compared and amplified signal Sout22 (a fourth signal output).

Of the comparator 63, the signal Sout21 is inputted to a positive (+) port on an input side and the signal Sout22 is inputted to a negative (−) port on the input side. The comparator 63 outputs a compared and amplified detection signal Sdt2 (a second differential output).

The detection signal Sdt2 outputted from the detection unit 41 is inputted to the communication unit 42. The communication unit 42 is connected to the signal line Ls41 through the signal line Ls45, and is connected to the signal line Ls43 through the signal line Ls46. The communication unit 42 transmits and receives a signal to and from the communication unit 51 of the communication equipment 4.

Here, the conductor 45 and the conductor 46 are located substantially parallel to the communication equipment 4 with the human body 6 interposed in between. The conductor 43 and the conductor 44 are located substantially perpendicular to the communication equipment 4 with the human body 6 interposed in between. In addition, the conductor 45 and the conductor 46 are located closer to the communication equipment 4 than the conductor 43 and the conductor 44 are.

The signal Sout1, the signal Sout2, and the detection signal Sdt1 outputted from the detection unit 11 are inputted to the determination unit 7. In addition, the signal Sout21, the signal Sout22, and the detection signal Sdt2 outputted from the detection unit 41 are inputted to the determination unit 7. The determination unit 7 determines the presence of the human bodies based on the signals, or determines whether or not the human body is seated, for example.

Figure 9:
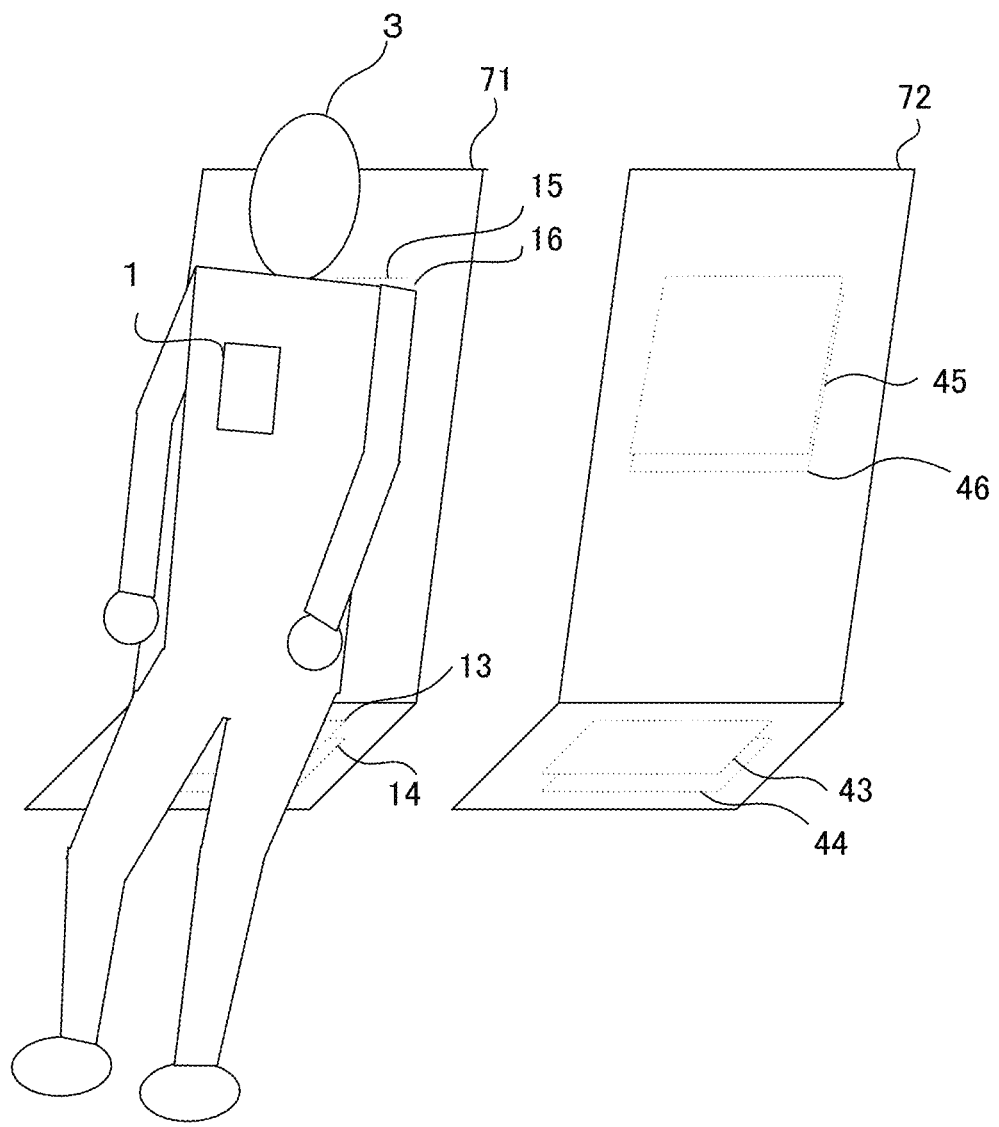
FIG. 9 is a view showing a situation in the second embodiment where a human body is seated on a seat.

Next, the living body communication apparatus 110 in a situation where the human body 3 is seated on a seat 71 will be described with reference to FIG. 9 and FIG. 10. FIG. 9 is a view showing the situation where the human body 3 is seated on the seat 71. FIG. 10 is a table showing characteristics of the living body communication apparatus 110 in the situation where the human body 3 is seated on the seat 71. Values shown in FIG. 10 are calculated by the electromagnetic field simulation and are normalized with the transmission level of the communication equipment 1.

As shown in FIG. 9, the conductor 15 and the conductor 16 are provided in an upper part of the seat 71 (a first seat) with which the back of the human body comes into contact, and the conductor 13 and the conductor 14 are provided in a lower part of the seat 71 with which the buttocks of the human body come into contact. The conductor 45 and the conductor 46 are provided in an upper part of a seat 72 (a second seat) with which the back of the human body comes into contact, and the conductor 43 and the conductor 44 are provided in a lower part of the seat 72 with which the buttocks of the human body come into contact.

Here, the seat 71 and the seat 72 are those installed in a vehicle, a train car, an airplane, a ship, a movie theater, or a performing theater.

The conductor 15 comes into contact with or close to the human body. The conductor 16 is opposed to the human body with the conductor 15 interposed in between. The conductor 13 comes into contact with or close to the human body. The conductor 14 is opposed to the human body with the conductor 13 interposed in between.

Here, the human body 3 with the communication equipment 1 attached to the chest is seated on the seat 71. No human body is seated on the seat 72. In FIG. 9, the illustration of the communication equipment 2 excluding the conductors 13 to 16 and of the communication equipment 5 excluding the conductors 43 to 46 is omitted in order to simplify the description.

As shown in FIG. 10, the detection signal Sdt1 detected by the communication equipment 2 takes on a relatively large value (−1.22 dB) when the human body 3 is seated on the seat 71. On the other hand, the detection signal Sdt2 detected by the communication equipment 5 takes on a relatively small value (−17.58 dB) when no human body is seated on the seat 72. A difference between the detection signal Sdt1 and the detection signal Sdt2 reaches a large value of +16.36 dB.

For this reason, it is possible to detect the fact that the human body 3 is seated on the seat 71 with high sensitivity. In addition, it is possible to detect the fact that no human body is seated on the seat 72 with high sensitivity. Accordingly, the authentication of an ID of an individual transmitted from the communication equipment 1 attached to the human body 3 can easily be associated with the communication equipment on the human body 3 side. In the meantime, both of a value obtained from a formula (the signal Sout1−the signal Sout21) and a value obtained from a formula (the signal Sout2−the signal Sout22), which are important values each indicating a magnitude of a crosstalk, are positive values that represent the transmission by the communication equipment 1. Here, the absolute value of a value obtained from a formula {(Sout1−Sout21)−(Sout2−Sout22)} measures the overall evaluation of the crosstalk, where the larger absolute value represents the smaller crosstalk. In the above case, the large value of 16.36 dB shows the small crosstalk.

Figure 11:
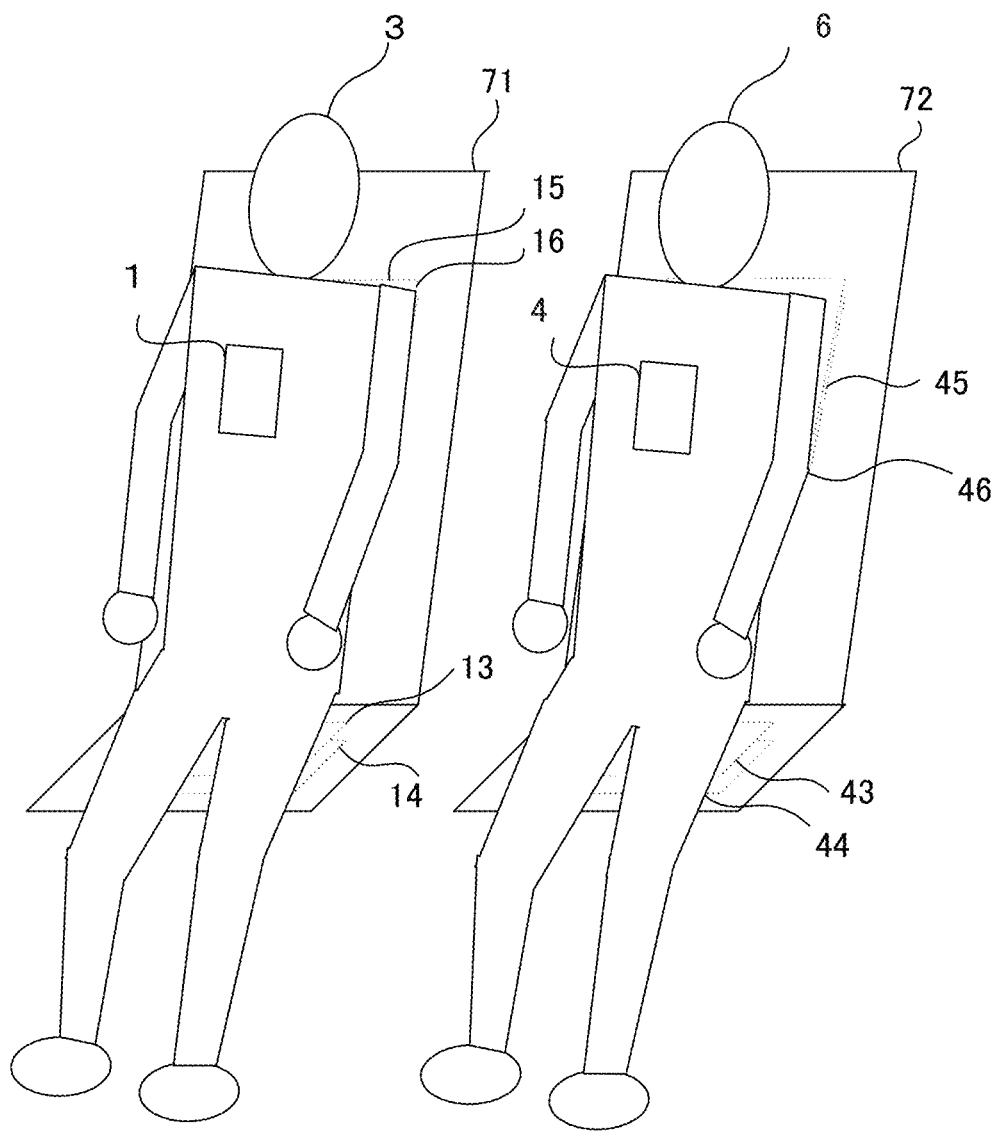
FIG. 11 is a view showing a situation in the second embodiment where two human bodies are respectively seated on two seats.

Next, the living body communication apparatus 110 in a situation where the human body 3 is seated on the seat 71 and the human body 6 is seated on the seat 72 will be described with reference to FIG. 11 and FIG. 12. FIG. 11 is a view showing the situation where the human body 3 is seated on the seat 71 and the human body 6 is seated on the seat 72. FIG. 12 is a table showing characteristics of the living body communication apparatus 110 in the situation where the human body 3 is seated on the seat 71 and the human body 6 is seated on the seat 72. Values shown in FIG. 12 are calculated by the electromagnetic field simulation, and are normalized with the transmission level of the communication equipment 1 at the time of transmission by the communication equipment 1 and normalized with a transmission level of the communication equipment 4 at the time of transmission by the communication equipment 4.

As shown in FIG. 11, the human body 3 with the communication equipment 1 attached to the chest is seated on the seat 71. Moreover, the human body 6 with the communication equipment 4 attached to the chest is seated on the seat 72. In FIG. 11, the illustration of the communication equipment 2 excluding the conductors 13 to 16 and of the communication equipment 5 excluding the conductors 43 to 46 is omitted in order to simplify the description.

As shown in FIG. 12, at the time of transmission by the communication equipment 1, the detection signal Sdt1 detected by the communication equipment 2 is at a relatively large value (−1.08 dB) and the detection signal Sdt2 detected by the communication equipment 5 is at a relatively large value (−2.56 dB). A difference between the detection signal Sdt1 and the detection signal Sdt2 reaches a relatively large value of +1.48 dB.

At the time of the transmission by the communication equipment 4, the detection signal Sdt1 detected by the communication equipment 2 is at a relatively large value (−2.36 dB) and the detection signal Sdt2 detected by the communication equipment 5 is at a relatively large value (−1.03 dB). A difference between the detection signal Sdt1 and the detection signal Sdt2 reaches a relatively large value of −1.33 dB.

Since the absolute values of the detection signal Sdt1 and the detection signal Sdt2 are equal to or below 2.6 dB, it is possible to detect the fact that the human body 3 is seated on the seat 71 and the fact that the human body 6 is seated on the seat 72 with high sensitivity. In the meantime, when the value obtained from the formula (Sout1−Sout21) and the value obtained from the formula (Sout2−Sout22) are positive, the values represent the transmission by the communication equipment 1. On the other hand, when the above-mentioned values are negative, the values represent the transmission by the communication equipment 4. Accordingly, authentication of an ID of an individual transmitted from any one of the communication equipment 1 and the communication equipment 4 can easily be associated with the communication equipment on the corresponding human body side.

In the characteristics shown in FIG. 12, the absolute value of the value obtained from the formula {(Sout1−Sout21)−(Sout2−Sout22)} that shows the overall evaluation of the crosstalk is smaller than the corresponding value in FIG. 10 because the human body 3 and the human body 6 are electrically coupled with each other and the crosstalk between the sets of the communication equipment is slightly increased as compared to the case shown in FIG. 10 where only the human body 3 is seated.

As described above, in the living body communication apparatus of the embodiment, the living body communication apparatus 110 is provided with the communication equipment 1, the communication equipment 2, the communication equipment 4, the communication equipment 5, and the determination unit 7. When the human body 3 is seated on the seat 71 and no human body is seated on the adjacent seat 72, the detection signal Sdt1 detected by the communication equipment 2 is at a relatively large value while the detection signal Sdt2 detected by the communication equipment 5 is at a relatively small value. When the human body 3 is seated on the seat 71 and the human body 6 is seated on the seat 72, the detection signal Sdt1 detected by the communication equipment 2 is at a relatively large value and the detection signal Sdt2 detected by the communication equipment 5 is at a relatively large value at the time of the transmission by the communication equipment 1. Meanwhile, the detection signal Sdt1 detected by the communication equipment 2 is at a relatively large value and the detection signal Sdt2 detected by the communication equipment 5 is at a relatively large value at the time of transmission by the communication equipment 4.

Accordingly, the living body communication apparatus 110 of the embodiment can determine the presence of the human body 3 and/or the human body 6. When information on an ID of an individual is transmitted from the communication equipment 1 or the communication equipment 4, it is possible to associate authentication of the ID of the individual with the nearby communication equipment.

In the embodiment, the conductor 13, the conductor 14, the conductor 43, and the conductor 44 are located in contact with or close to the buttocks of a human body when the human body is seated on the corresponding seat. Instead, the above-mentioned conductors may be located in contact with or close to the sole of a foot of the human body, for example. Meanwhile, the conductor 15, the conductor 16, the conductor 45, and the conductor 46 are located in contact with or close to the back of the human body when the human body is seated on the corresponding seat. Instead, the above-mentioned conductors may be located in contact with or close to the back of the head or a leg of the human body.

Figure 13:
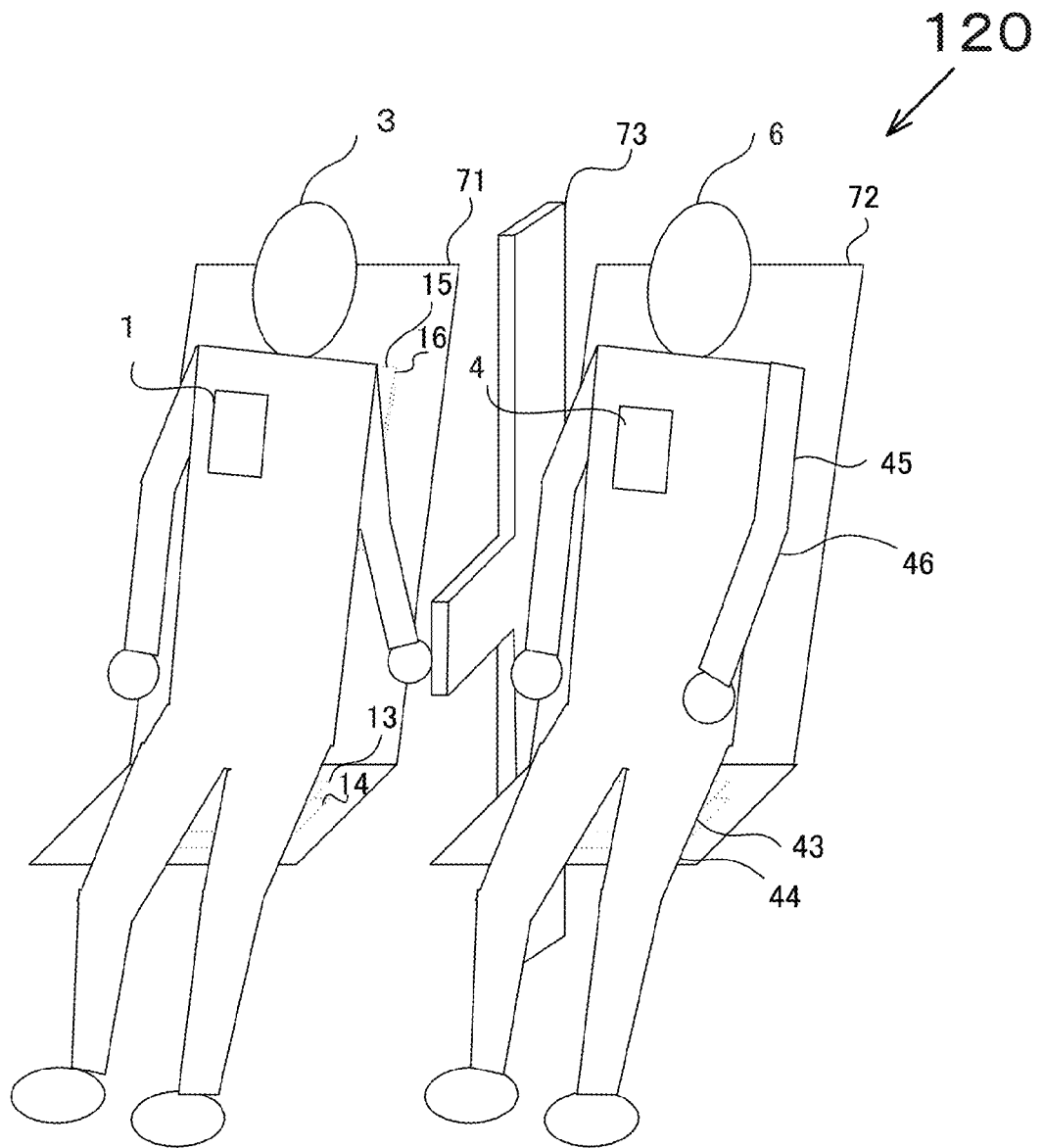
FIG. 13 is a view showing a schematic configuration of a living body communication apparatus according to a third embodiment.

A living body communication apparatus according to a third embodiment will be described with reference to FIG. 13. FIG. 13 is a view showing a schematic configuration of the living body communication apparatus. The embodiment is configured to reduce crosstalk by providing a reference conductor between the seats.

In the following, the same constituent portions as the constituent portions in the second embodiment will be denoted by the same reference numerals, and descriptions will be given only of different portions while omitting the descriptions of the same constituent portions.

As shown in FIG. 13, in a living body communication apparatus 120, a reference conductor 73 is provided between the seat 71 and the seat 72 of the communication apparatus 110 of the second embodiment. The reference conductor 73 is set at the reference potential Vss.

Next, characteristics of the living body communication apparatus 120 in a situation where the human body 3 with the communication equipment 1 attached to the chest is seated on the seat 71 and the human body 6 with the communication equipment 4 attached to the chest is seated on the seat 72 will be described with reference to FIG. 14 to FIG. 19.

FIG. 14 shows characteristics of the living body communication apparatus 120 when the reference conductor 73 is separated from the human body 3 and the human body 6. Values in FIG. 14 are calculated by the electromagnetic field simulation, and are normalized with the transmission level of the communication equipment 1 at the time of transmission by the communication equipment 1 and normalized with the transmission level of the communication equipment 4 at the time of transmission by the communication equipment 4.

As shown in FIG. 14, when the reference conductor 73 is provided between the seat 71 and the seat 72, the value of the detection signal Sdt1 detected by the communication equipment 2 is (−2.03 dB) and the value of the detection signal Sdt2 detected by the communication equipment 5 is (+2.14 dB) at the time of the transmission by the communication equipment 1, while the value of the detection signal Sdt1 detected by the communication equipment 2 is (+2.49 dB) and the value of the detection signal Sdt2 detected by the communication equipment 5 is (−2.03 dB) at the time of the transmission by the communication equipment 4.

Since the absolute values of the detection signal Sdt1 and the detection signal Sdt2 are equal to or below 2.5 dB, it is possible to detect the fact that the human body 3 is seated on the seat 71 and the fact that the human body 6 is seated on the seat 72 with high sensitivity. In the meantime, when the value obtained from the formula (Sout1−Sout21) and the value obtained from the formula (Sout2−Sout22) are positive, the values represent the transmission of the communication equipment 1. On the other hand, when the above-mentioned values are negative, the values represent the transmission of the communication equipment 4. Accordingly, authentication of an ID of an individual transmitted from any one of the communication equipment 1 and the communication equipment 4 can easily be associated with the communication equipment on the corresponding human body side.

It is confirmed from the absolute value of each value {(Sout−Sout21)−(Sout2−Sout22)}, which shows the comprehensive evaluation of the crosstalk, that the crosstalk is improved by about 3 dB in the case where the reference conductor 73 is provided (FIG. 14) as compared to the case where the reference conductor 73 is not provided (FIG. 12).

Figure 16:
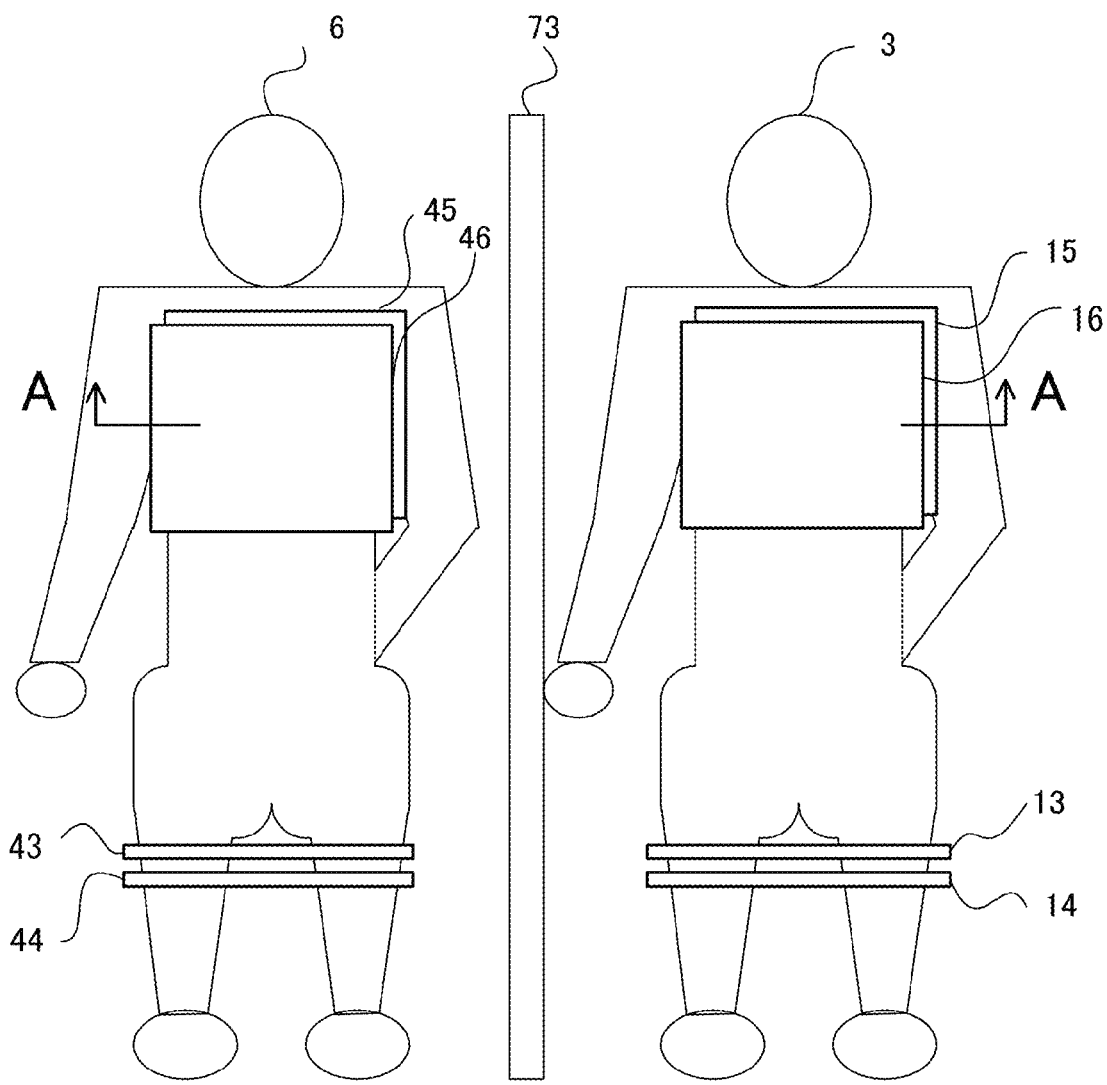
FIG. 16 is a view showing a situation in the third embodiment where two human bodies are seated, which is viewed from the back side.
Figure 17:
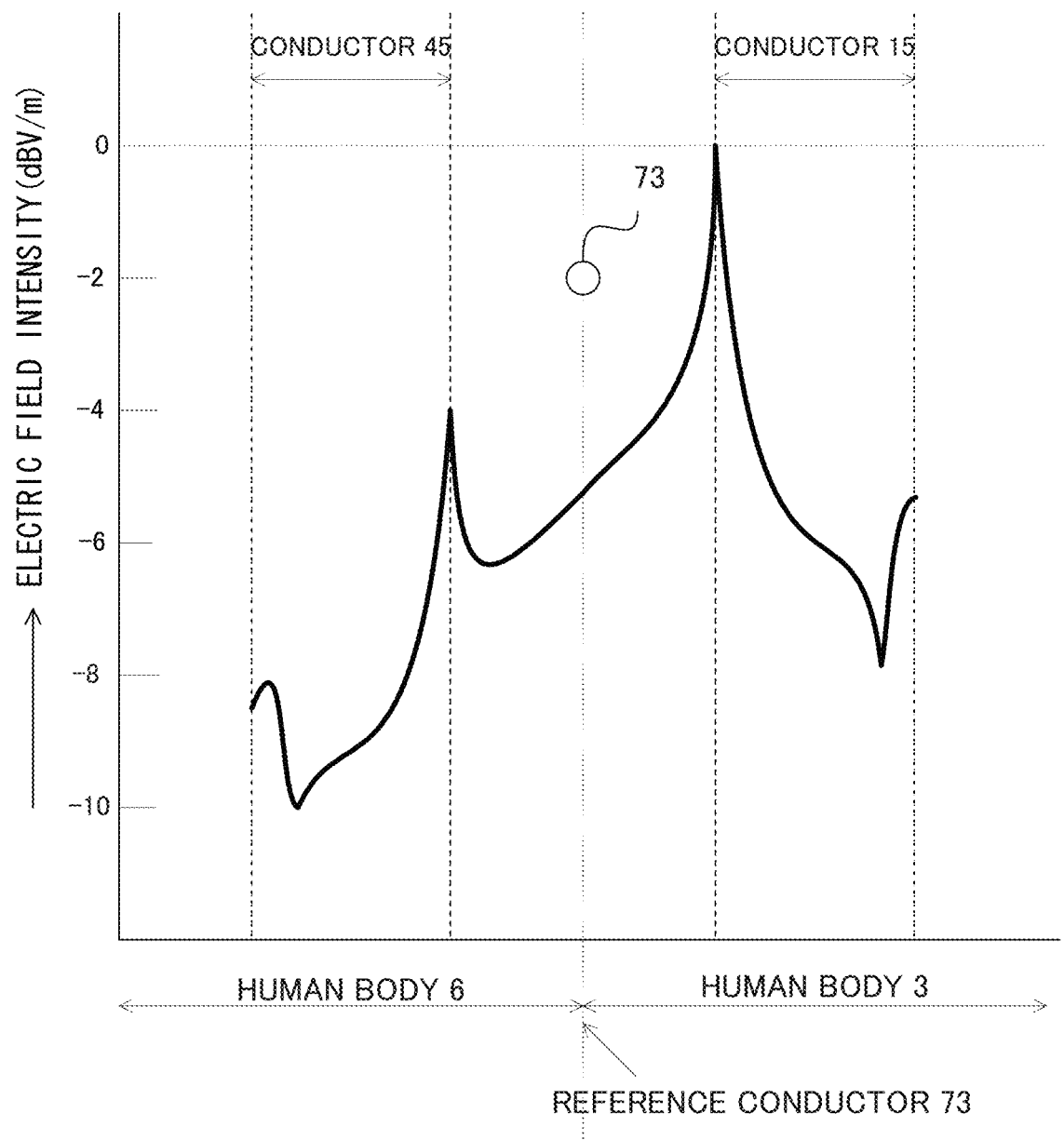
FIG. 17 is a graph showing electric field intensity distribution along the A-A line in FIG. 16.
Figure 18:
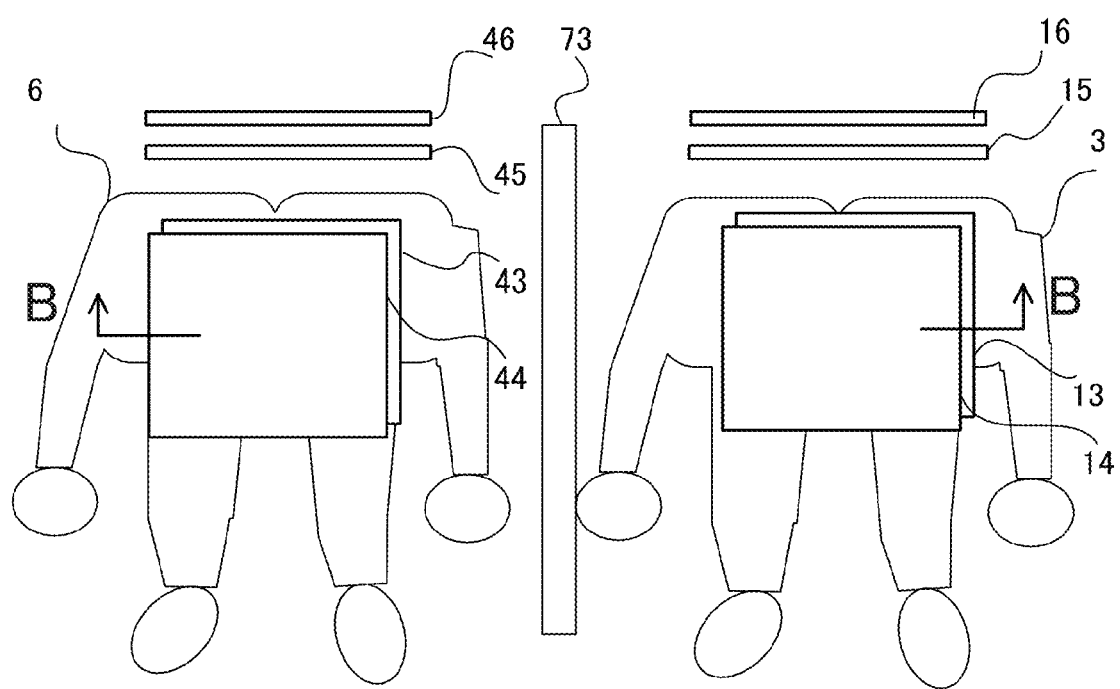
FIG. 18 is a view showing the situation in the third embodiment where the two human bodies are seated, which is viewed from the buttocks side.
Figure 19:
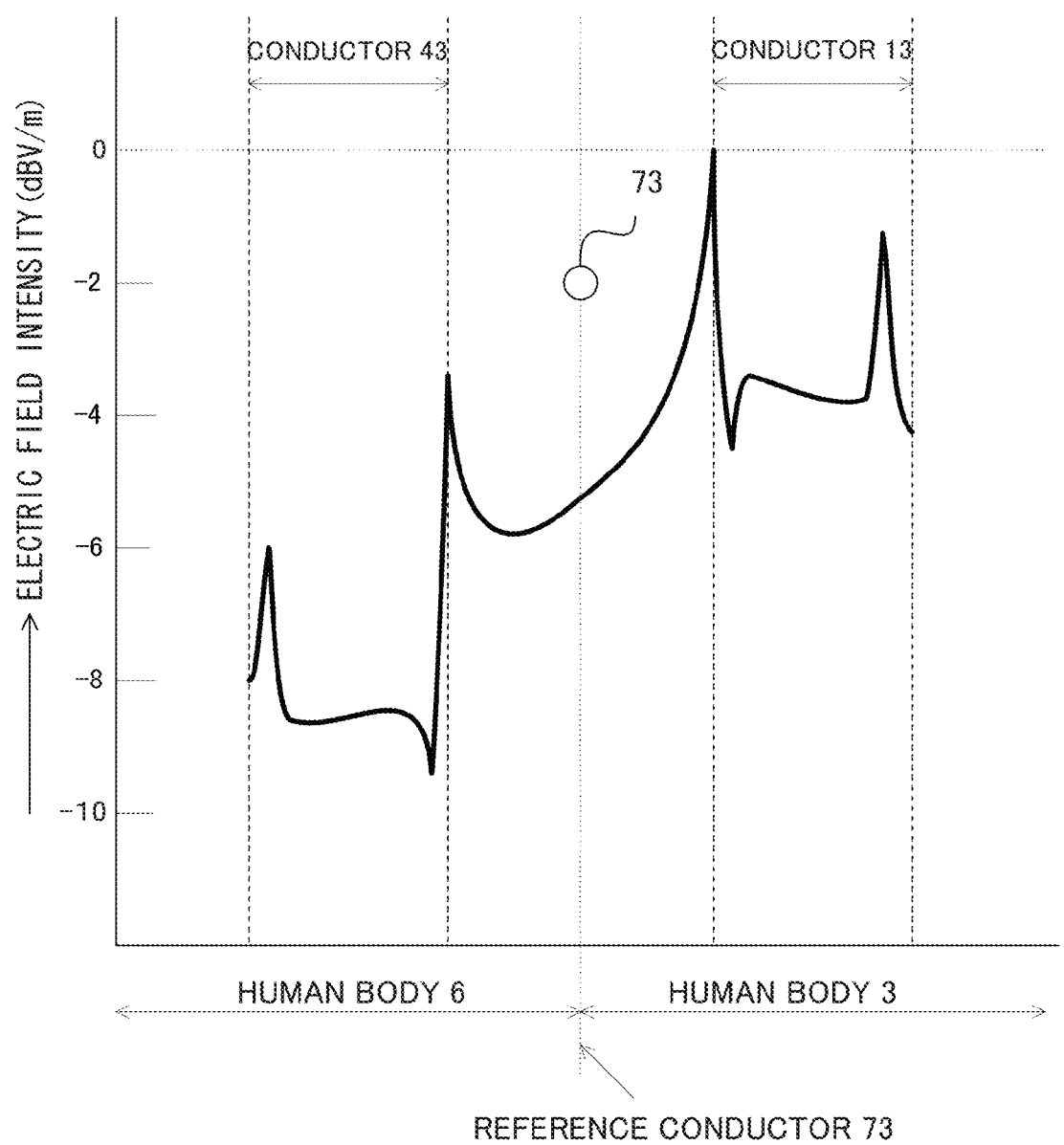
FIG. 19 is a graph showing electric field intensity distribution along the B-B line in FIG. 18.

FIG. 15 shows characteristics of the living body communication apparatus 120 when the left hand of the human body 3 is in contact with the reference conductor. FIG. 16 is a view showing a situation where the human body 3 and the living body 6 are seated and the left hand of the human body 3 is in contact with the reference conductor 73. FIG. 16 is viewed from the back side. FIG. 17 is a graph showing electric field intensity distribution along the A-A line in FIG. 16. FIG. 18 is a view showing the situation where the human body 3 and the human body 6 are seated and the left hand of the human body 3 is in contact with the reference conductor 73, which is viewed from the buttocks side. FIG. 19 is a graph showing electric field intensity distribution along the B-B line in FIG. 18.

Here, values in FIG. 15 are calculated by the electromagnetic field simulation, and are normalized with the transmission level of the communication equipment 1 at the time of transmission by the communication equipment 1 and normalized with the transmission level of the communication equipment 4 at the time of transmission by the communication equipment 4. Values in FIG. 17 and FIG. 19 are normalized with electric field intensities at end portions of the conductor 15 and the conductor 13, respectively.

As shown in FIG. 15, when the reference conductor 73 is provided between the seat 71 and the seat 72 and the left hand of the human body 3 is in contact with the reference conductor 73, the value of the detection signal Sdt1 detected by the communication equipment 2 is (−2.20 dB) and the value of the detection signal Sdt2 detected by the communication equipment 5 is (+2.18 dB) at the time of the transmission by the communication equipment 1, while the value of the detection signal Sdt1 detected by the communication equipment 2 is (+4.34 dB) and the value of the detection signal Sdt2 detected by the communication equipment 5 is (−2.09 dB) at the time of the transmission by the communication equipment 4. Since the left hand of the human body 3 is in contact with the reference conductor 73, the crosstalk of the detection signal Sdt1 detected by the communication equipment 2 at the time of the transmission by the communication equipment 4 is improved by about 2 dB as compared to the case of FIG. 14.

For this reason, it is possible to detect the fact that the human body 3 is seated on the seat 71 and the fact that the human body 6 is seated on the seat 72 with high sensitivity. In the meantime, when the value obtained from the formula (Sout1−Sout21) and the value obtained from the formula (Sout2−Sout22) are positive, the values represent the transmission by the communication equipment 1. On the other hand, when the above-mentioned values are negative, the values represent the transmission by the communication equipment 4. Since the left hand of the human body 3 is in contact with the reference conductor 73, it is confirmed from the absolute value of the value obtained from the formula {(Sout1−Sout21)−(Sout2−Sout22)}, which shows the overall evaluation of the crosstalk at the time of the transmission by the communication equipment 4, that the crosstalk is improved by about 2 dB as compared to the case of FIG. 14. Accordingly, authentication of an ID of an individual transmitted from any one of the communication equipment 1 and the communication equipment 4 can easily be associated with the communication equipment on the corresponding human body side.

As shown in FIG. 17, at the chests in the case where the communication equipment 1 performs transmission while the left hand of the human body 3 is in contact with the reference conductor 73 (see FIG. 16), an electric field intensity at one end portion of the conductor 15 on the reference conductor 73 side takes on the highest value which is greater by 2 dBV/m than an electric field intensity of the reference conductor 73. The electric field intensity of the conductor 15 becomes smaller toward the other end side. Electric field intensity at one end portion of the conductor 45 on the reference conductor 73 side becomes smaller by 2 dBV/m than the electric field intensity of the reference conductor 73. The electric field intensity of the conductor 45 becomes smaller toward the other end side.

As shown in FIG. 19, at the buttocks in the case where the communication equipment 1 performs transmission while the left hand of the human body 3 is in contact with the reference conductor 73 (see FIG. 18), an electric field intensity at one end portion of the conductor 13 on the reference conductor 73 side takes on the highest value which is greater by 2 dBV/m than the electric field intensity of the reference conductor 73. The electric field intensity of the conductor 13 becomes smaller toward the other end side. Electric field intensity at one end portion of the conductor 43 on the reference conductor 73 side becomes smaller by 2 dBV/m than the electric field intensity of the reference conductor 73. The electric field intensity of the conductor 43 becomes smaller toward the other end side.

As described above, in the living body communication apparatus of the embodiment, the reference conductor 73 is provided between the seat 71 and the seat 72. The reference conductor 73 is set at the reference potential Vss. When the reference conductor 73 is provided between the seat 71 and the seat 72 and a human body is not in contact with the reference conductor 73, the crosstalk is improved by about 3 dB as compared to the case where the reference conductor 73 is not provided. When the reference conductor 73 is provided between the seat 71 and the seat 72 and the left hand of the human body 3 is in contact with the reference conductor 73, the crosstalk is improved by about 2 dB as compared to the case where the human body 3 is not in contact with the reference conductor 73.

Accordingly, it is possible to determine whether or not the human body is seated on each seat with higher sensitivity than the second embodiment. It is also possible to easily associate the authentication of an ID of an individual transmitted from the communication equipment 1 or the communication equipment 4 with the communication equipment on the corresponding human body side.

Figure 20:
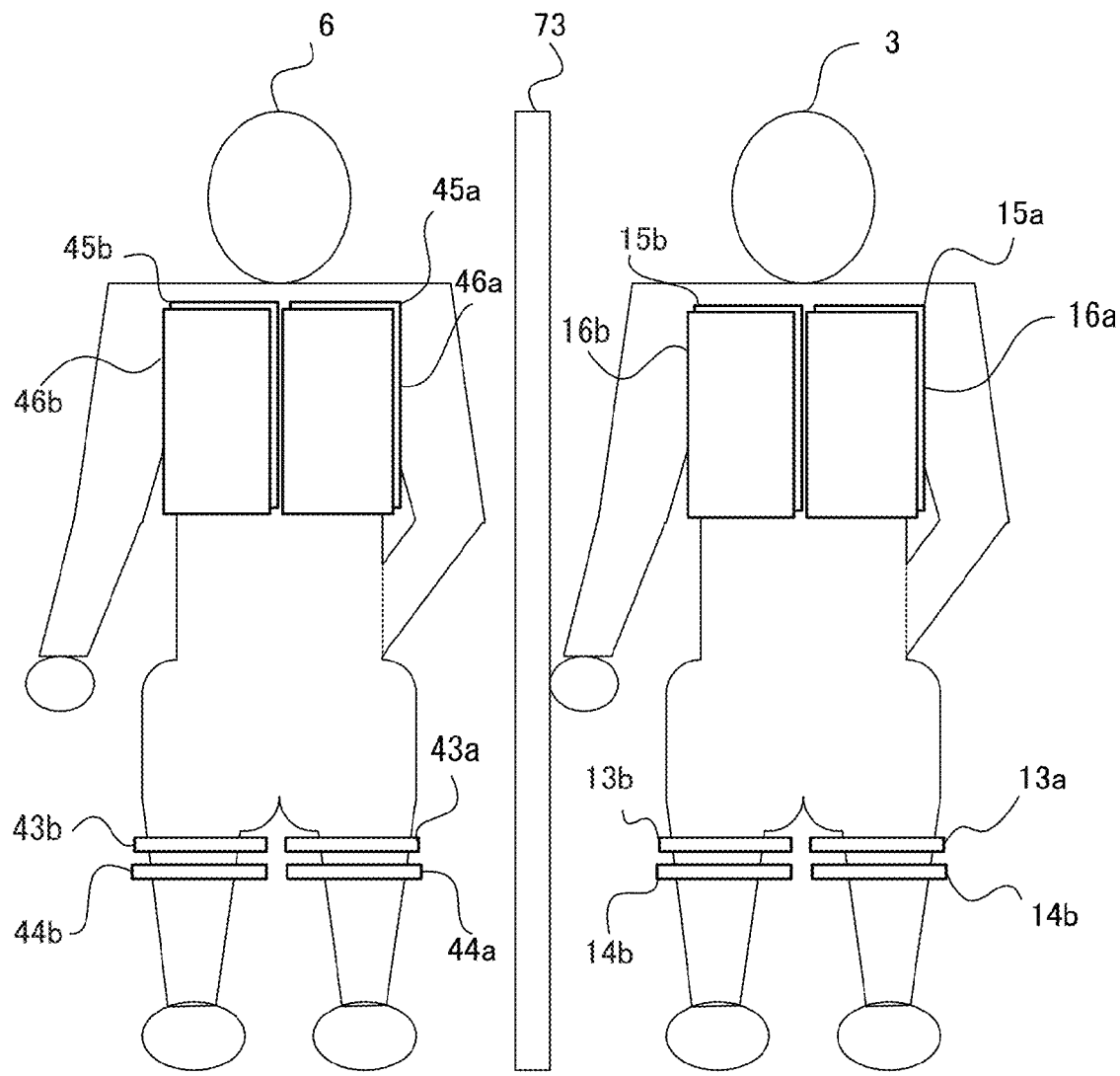
FIG. 20 is a view showing a schematic configuration of a living body communication apparatus according to a second modification.

In the embodiment, the seat 71 is provided with the conductors 13 to 16 while the seat 72 is provided with the conductors 43 to 46. However, the invention is not limited only to the above-described configuration. The conductors may be split like in a living body communication apparatus of a second modification shown in FIG. 20. Here, each of the conductors 13 to 16 is split into two pieces of a conductor 13a to 16a and a conductor 13b to 16b. Meanwhile, each of the conductors 43 to 46 is split into two pieces of a conductor 43a to 46a and a conductor 43b to 46b.

Figure 21:
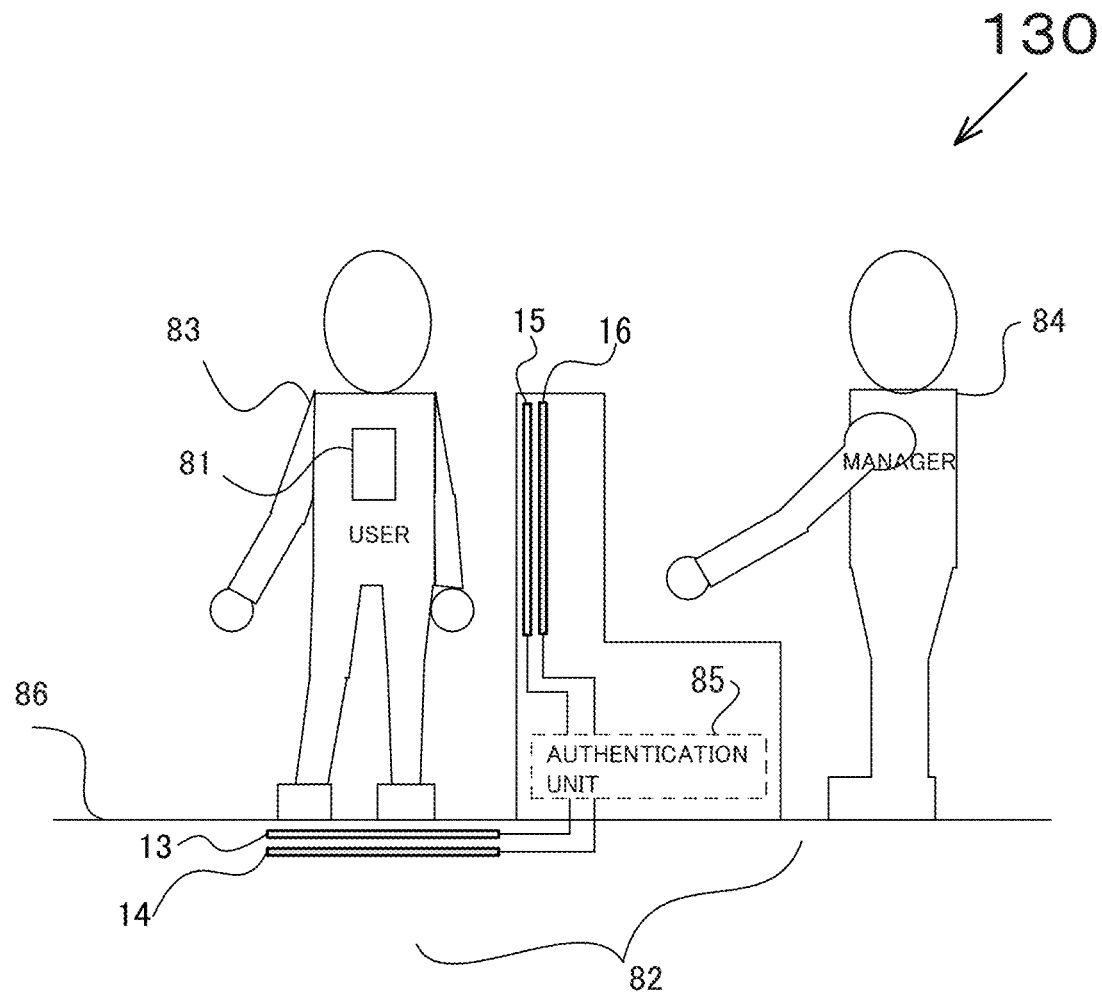
FIG. 21 is a view showing a schematic configuration of a living body communication apparatus according to a fourth embodiment.

A living body communication apparatus according to a fourth embodiment will be described with reference to FIG. 21. FIG. 21 is a view showing a schematic configuration of the living body communication apparatus. In the embodiment, customer management is executed by using the living body communication apparatus.

As shown in FIG. 21, a living body communication apparatus 130 is provided with communication equipment 81 (the first communication equipment) and communication equipment 82 (the second communication equipment).

The living body communication apparatus 130 is applied to a ticket gate at a station, and for confirmation of presence of a user or authentication of an ID of a user of a hall such as a movie theater and a performing theater, a shop, or the like. In the living body communication apparatus 130, living body communication is executed between the communication equipment 81 and the communication equipment 82 when a user 83 with the communication equipment 81 attached to the chest comes into contact with or close to the communication equipment 82. Here, ID information on the user 83 acquired by the communication equipment 82 is grasped and confirmed by a manager 84.

Like in the communication equipment 1 of the first embodiment, the communication equipment 81 is provided with the first communication unit and the first conductor, which are not illustrated in FIG. 21.

The communication equipment 82 is provided with the conductors 13 to 16, and an authentication unit 85. The conductor 13 and the conductor 14 are buried in a surface portion of a floor 86. Here, although the conductors are buried in the surface portion of the floor 86, the conductors may be placed immediately under a carpet or a rug or placed on the floor 86. At the time of confirmation of the presence of the user or authentication of the ID of the user, the conductor 13 and the conductor 14 come close to the sole of a foot of the user 83.

The conductor 15 and the conductor 16 are located away from the surface of the floor 86 in such a manner as to be substantially orthogonal to the conductor 13 and the conductor 14. At the time of the confirmation of the presence of the user or the authentication of the ID of the user, the conductor 15 and the conductor 16 come into contact with or close to the chest or a hand of the user 83.

Like in the communication equipment 1 of the first embodiment, the authentication unit 85 is provided with the first detection unit and the second communication unit. The connection between the authentication unit 85 and the conductors 13 to 16 is the same as the connection in the first embodiment and the relevant description is therefore omitted. The authentication unit 85 performs the confirmation of the presence of the user and the authentication of the ID of the user on the basis of the first signal output, the second signal output, and the first differential output which are outputted from the first detection unit.

As described above, the living body communication apparatus of the embodiment is provided with the communication equipment 81 and the communication equipment 82. The communication equipment 81 is provided with the first communication unit and the first conductor. The communication equipment 82 is provided with the conductors 13 to 16 and the authentication unit 85. The presence of the user is confirmed and the ID of the user is authenticated when the conductor 13 and the conductor 15 are in contact with or close to the user 83, and results of the confirmation and authentication are grasped and confirmed by the manager 84.

Accordingly, the living body communication apparatus 130 executes the confirmation of the presence of the user and the authentication of the ID of the user at the same time. For this reason, the living body communication apparatus 130 can be easily customized for fraud prevention and incentive offering.

Figure 22:
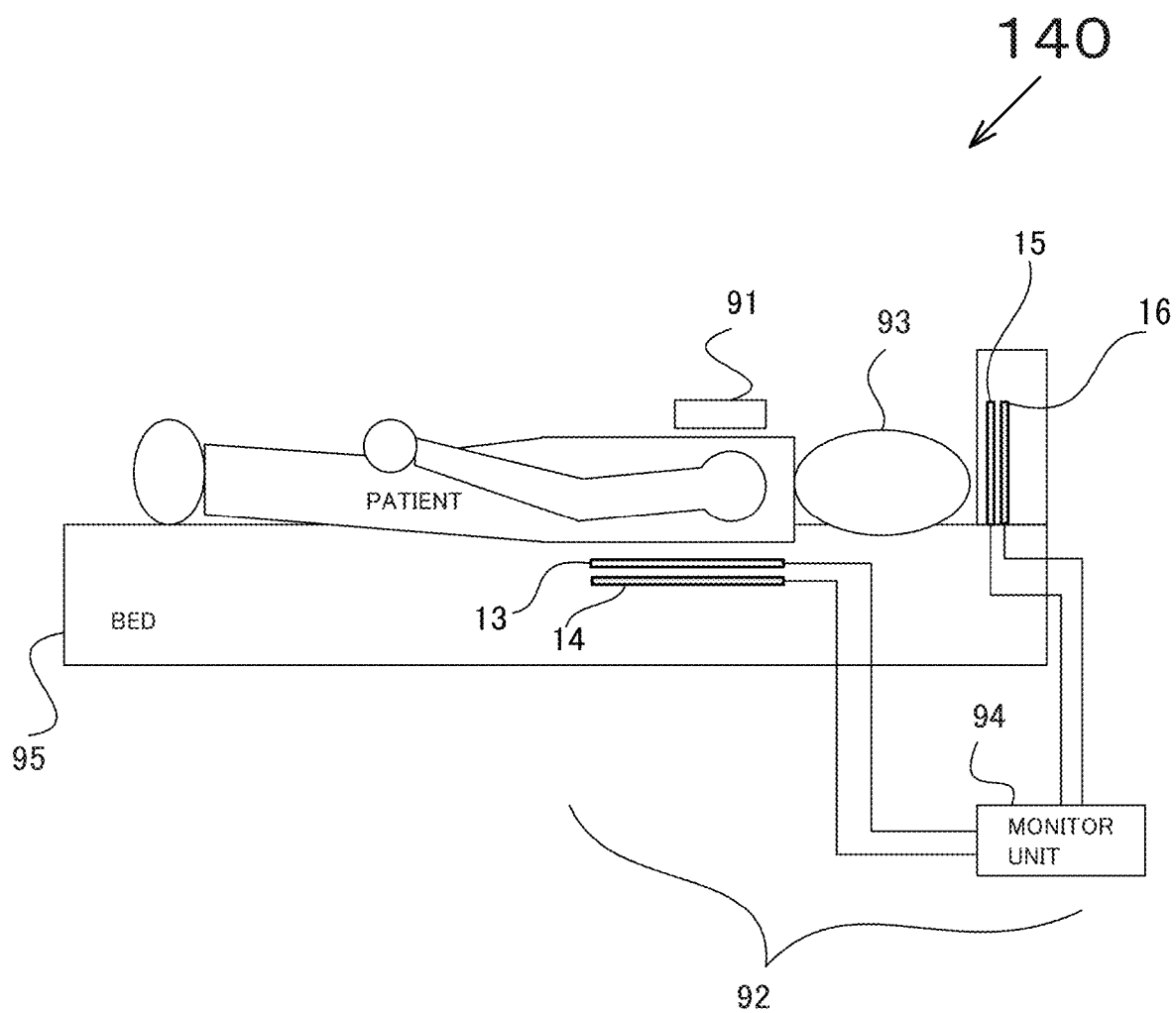
FIG. 22 is a view showing a schematic configuration of a living body communication apparatus according to a fifth embodiment.

A living body communication apparatus according to a fifth embodiment will be described with reference to FIG. 22. FIG. 22 is a view showing a schematic configuration of the living body communication apparatus. In the embodiment, health care is provided to a patient by using the living body communication apparatus.

As shown in FIG. 22, a living body communication apparatus 140 is provided with communication equipment 91 (the first communication equipment) and communication equipment 92 (the second communication equipment).

The living body communication apparatus 140 is applied to grasp of living body information on and a state of a patient 93 who lies on a bed 95 in a hospital or a home. In the living body communication apparatus 140, living body communication is executed between the communication equipment 91 and the communication equipment 92 when the patient 93 with the communication equipment 91 attached to the chest comes into contact with or close to the communication equipment 92. Here, information on the patient 93 acquired by the communication equipment 92 is grasped and confirmed by a doctor or a manager who belongs to a hospital, for example.

Like in the communication equipment 1 of the first embodiment, the communication equipment 91 is provided with the first communication unit and the first conductor, which are not illustrated in FIG. 22.

The communication equipment 92 is provided with the conductors 13 to 16, and a monitor unit 94. The conductor 13 and the conductor 14 are buried in a surface portion of the bed 95. The conductor 15 and the conductor 16 are buried in a surface of a projected portion of the bed 95 in such a manner as to be substantially orthogonal to the conductor 13 and the conductor 14.

Like in the communication equipment 1 of the first embodiment, the monitor unit 94 is provided with the first detection unit and the second communication unit. The connection between the monitor unit 94 and the conductors 13 to 16 is the same as the connection in the first embodiment and the relevant description is therefore omitted. The monitor unit 94 grasps the living body information on and the state of the patient 93 on the basis of the first signal output, the second signal output, and the first differential output which are outputted from the first detection unit. When the patient 93 is located away by at least a given distance from the conductor 13 and the conductor 15, the monitor unit 94 determines that the patient 93 is in an abnormal state (such as the patient 93 falling off the bed 95).

As described above, the living body communication apparatus of the embodiment is provided with the communication equipment 91 and the communication equipment 92. The communication equipment 91 is provided with the first communication unit and the first conductor. The communication equipment 92 is provided with the conductors 13 to 16 and the monitor unit 94. The conductor 13 and the conductor 14 are buried in the surface portion of the bed 95. The conductor 15 and the conductor 16 are buried in the surface of the projected portion of the bed 95 in such a manner as to be substantially orthogonal to the conductor 13 and the conductor 14.

Accordingly, in the living body communication apparatus 140, when the living body communication is not executed between the communication equipment 91 and the communication equipment 92 and no signals from the monitor unit 94 are observed, then the doctor or the manager can determine without watching a monitor screen or the like that the patient 93 has fallen off the bed 95.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A living body communication apparatus comprising:
   first communication equipment including
      a first communication unit configured to transmit and receive a signal, and
      a first conductor electrically connected to the first communication unit; and
   second communication equipment including
      a second conductor,
      a third conductor located in parallel with the second conductor and set to first reference potential,
      a fourth conductor separated from the second conductor and located substantially orthogonal to the second conductor,
      a fifth conductor located in parallel with the fourth conductor and set to the first reference potential,
      a first detection unit configured to detect a first differential output between signal outputs respectively observed by the second conductor and the fourth conductor, and
      a second communication unit configured to receive the first differential output and to transmit and receive a signal, wherein communication is executed between the first communication equipment and the second communication equipment when a surface of a first living body comes into contact with or close to the first conductor, the second conductor, and the fourth conductor.

2. The apparatus according to claim 1, wherein
the first living body is a first human body,
the second to fifth conductors are located in a first seat for the first human body to be seated,
when the first human body is seated on the first seat, the second conductor comes into contact with or close to the buttocks of the first human body and the fourth conductor comes into contact with or close to any of the back, the back of the head and a leg of the first human body, and
the communication is executed between the first communication equipment and the second communication equipment when the first human body is seated on the first seat and the first conductor comes into contact with or close to any of a hand and the chest of the first human body.

3. The apparatus according to claim 1, wherein
the first living body is a first human body,
the second to fifth conductors are located in a first seat for the first human body to be seated,
when the first human body is seated on the first seat, the second conductor comes into contact with or close to the sole of a foot of the first human body and the fourth conductor comes into contact with or close to any of the back, the back of the head, and a leg of the first human body, and
the communication is executed between the first communication equipment and the second communication equipment when the first human body is seated on the first seat and the first conductor comes into contact with or close to any of a hand and the chest of the first human body.

4. The apparatus according to claim 1, further comprising:
third communication equipment including
  a third communication unit configured to transmit and receive a signal, and
  a sixth conductor electrically connected to the third communication unit;
fourth communication equipment including
  a seventh conductor,
  an eighth conductor located in parallel with the seventh conductor and set to the first reference potential,
  a ninth conductor separated from the seventh conductor and located substantially orthogonal to the seventh conductor,
  a tenth conductor located in parallel with the ninth conductor and set to the first reference potential,
  a second detection unit configured to detect a second differential output between signal outputs respectively observed by the seventh conductor and the ninth conductor, and
  a fourth communication unit configured to receive the second differential output and to transmit and receive a signal; and
a determination unit configured to receive the first differential output, the second differential output, a first signal output detected by the second conductor, a second signal output detected by the fourth conductor, a third signal output detected by the seventh conductor, and a fourth signal output detected by the ninth conductor, and to determine presence of a living body, wherein communication is executed between the third communication equipment and the fourth communication equipment when a surface of a second living body comes into contact with or close to the sixth conductor, the seventh conductor, and the ninth conductor, and
the determination unit determines presence of at least any one of the first living body and the second living body.

5. The apparatus according to claim 4, wherein
the first living body is a first human body,
the second to fifth conductors are located in a first seat for the first human body to be seated,
when the first human body is seated on the first seat, the second conductor comes into contact with or close to the buttocks of the first human body and the fourth conductor comes into contact with or close to any of the back, the back of the head, and a leg of the first human body,
the communication is executed between the first communication equipment and the second communication equipment when the first human body is seated on the first seat and the first conductor comes into contact with or close to any of a hand and the chest of the first human body,
the second living body is a second human body,
the seventh to tenth conductors are located in a second seat for the second human body to be seated,
when the second human body is seated on the second seat, the seventh conductor comes into contact with or close to the buttocks of the second human body and the ninth conductor comes into contact with or close to any of the back, the back of the head, and a leg of the second human body, and
the communication is executed between the third communication equipment and the fourth communication equipment when the second human body is seated on the second seat and the sixth conductor comes into contact with or close to any of a hand and the chest of the second human body.

6. The apparatus according to claim 4, wherein
the first living body is a first human body,
the second to fifth conductors are located in a first seat for the first human body to be seated,
when the first human body is seated on the first seat, the second conductor comes into contact with or close to the sole of a foot of the first human body and the fourth conductor comes into contact with or close to any of the back, the back of the head, and a leg of the first human body,
the communication is executed between the first communication equipment and the second communication equipment when the first human body is seated on the first seat and the first conductor comes into contact with or close to any of a hand and the chest of the first human body,
the second living body is a second human body,
the seventh to tenth conductors are located in a second seat for the second human body to be seated,
when the second human body is seated on the second seat, the seventh conductor comes into contact with or close to the sole of a foot of the second human body and the ninth conductor comes into contact with or close to any of the back, the back of the head, and a leg of the second human body, and
the communication is executed between the third communication equipment and the fourth communication equipment when the second human body is seated on the second seat and the sixth conductor comes into contact with or close to any of a hand and the chest of the second human body.

7. The apparatus according to claim 4, wherein
a reference conductor is provided between the first seat and the second seat, and
the reference conductor is set to the first reference potential.

8. The apparatus according to claim 7, wherein
living body communication is performed when the first living body is in contact with the reference conductor.

9. The apparatus according to claim 4, wherein
the first seat and the second seat are installed in any of a vehicle, a train car, an airplane, a ship, a movie theater, and a performing theater.

10. The apparatus according to claim 1, wherein
each of the first to fifth conductors has a plate-like shape and is composed of any one of a conductive sheet, a conductive ink, and a transparent conductor.

11. The apparatus according to claim 1, wherein
the first communication equipment is provided with a magnetic field transmission reception unit located in parallel with the first conductor.

12. The apparatus according to claim 11, wherein
the magnetic field transmission reception unit has a structure including a signal line wound around a ferrite bar.

13. A living body communication apparatus comprising:
first communication equipment including
    a first communication unit configured to transmit and receive a signal, and
    a first conductor electrically connected to the first communication unit; and
second communication equipment including
    a second conductor,
    a third conductor located in parallel with the second conductor and set to first reference potential,
    a fourth conductor separated from the second conductor and located substantially orthogonal to the second conductor,
    a fifth conductor located in parallel with the fourth conductor and set to the first reference potential, and
    an authentication unit configured to receive a first signal output observed by the second conductor, a second signal output observed by the fourth conductor, and a first differential output between the first signal output and the second signal output, and to authenticate a first human body with the attached first communication equipment when the first human body comes into contact with or close to the second conductor and the fourth conductor.

14. The apparatus according to claim 13, wherein
the living body communication apparatus is applied to any of a ticket gate at a station, confirmation of a user of a movie theater, confirmation of a user of a performing theater, confirmation of a user of a shop, and authentication of an identification of the user of the shop.

15. The apparatus according to claim 13, wherein
the first human body is a user, and
information on the authentication performed by the second communication equipment is grasped by a manager.

16. The apparatus according to claim 13, wherein
the second and third conductors are buried in a surface of a floor, placed on the floor, or placed immediately under a carpet or a rug.

17. A living body communication apparatus comprising:
first communication equipment including
    a first communication unit configured to transmit and receive a signal, and
    a first conductor electrically connected to the first communication unit,
the first communication equipment being configured to observe living body information on a first human body; and
second communication equipment including
    a second conductor,
    a third conductor located in parallel with the second conductor and set to first reference potential,
    a fourth conductor separated from the second conductor and located substantially orthogonal to the second conductor,
    a fifth conductor located in parallel with the fourth conductor and set to the first reference potential, and
    a monitor unit configured to receive a first signal output observed by the second conductor, a second signal output observed by the fourth conductor, and a first differential output between the first signal output and the second signal output, to receive the living body information on the first human body from the first communication equipment when the first human body with the attached first communication equipment comes into contact with or close to the second conductor and the fourth conductor, and to determine that an abnormal condition happens when the first human body with the attached first communication equipment is located away by at least a predetermined distance from the second conductor and the fourth conductor.

18. The apparatus according to claim 17, wherein
the living body communication apparatus is applied to grasp of living body information on a patient lying on a bed and to confirmation of a state of the patient.

19. The apparatus according to claim 17, wherein
the first living body is a patient, and
determination information acquired by the second communication equipment is grasped by a doctor or a manager.

20. The apparatus according to claim 17, wherein
the second and third conductors are buried in a surface of the bed.

* * * * *